United States Patent
Kretschmar et al.

(10) Patent No.: US 9,057,864 B2
(45) Date of Patent: Jun. 16, 2015

(54) HARSH ENVIRONMENT CONNECTOR WITH SEAL CLOSURE ASSISTING DEVICE

(71) Applicant: Teledyne Instruments, Inc., Thousand Oaks, CA (US)

(72) Inventors: Justin M. Kretschmar, Dayton Beach, FL (US); Richard T. Jones, Sanford, FL (US); Kenneth M. Nagengast, Longwood, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 111 days.

(21) Appl. No.: 13/958,242

(22) Filed: Aug. 2, 2013

(65) Prior Publication Data

US 2015/0036986 A1 Feb. 5, 2015

(51) Int. Cl.
*G02B 6/50* (2006.01)
*G02B 6/38* (2006.01)

(52) U.S. Cl.
CPC .............. *G02B 6/506* (2013.01); *G02B 6/3816* (2013.01)

(58) Field of Classification Search
CPC .............................. G02B 6/506; G02B 6/3816
See application file for complete search history.

(56) References Cited

U.S. PATENT DOCUMENTS

| | | | |
|---|---|---|---|
| 3,982,804 A | 9/1976 | Marechal | |
| 4,203,640 A | 5/1980 | Bice et al. | |
| 4,277,135 A | 7/1981 | Schrott et al. | |
| 4,541,481 A | 9/1985 | Lancaster | |
| 4,606,603 A | 8/1986 | Cairns | |
| 4,616,900 A | 10/1986 | Cairns | |
| 4,666,242 A | 5/1987 | Cairns | |
| 4,673,242 A | 6/1987 | Logan et al. | |
| 4,753,611 A | 6/1988 | Kobler | |
| 4,773,725 A | 9/1988 | Ashman et al. | |
| 4,795,359 A | 1/1989 | Alcock et al. | |
| 4,865,563 A | 9/1989 | Ney et al. | |
| 4,878,731 A | 11/1989 | Caron et al. | |
| 4,929,184 A | 5/1990 | Emadi et al. | |

(Continued)

FOREIGN PATENT DOCUMENTS

EP 0538089 A1 4/1993
GB 2112173 A 7/1983

(Continued)

OTHER PUBLICATIONS

International Search Report and Written Opinion for related international patent application No. PCT/US2014/045040, mailed on Nov. 5, 2014, in 16 pages.

*Primary Examiner* — Jerry Rahll
(74) *Attorney, Agent, or Firm* — Procopio Cory Hargreaves & Savitch LLP

(57) ABSTRACT

An underwater rolling seal connector assembly has releasably mateable plug and receptacle units with one or more rolling seals mounted in front faces of receptacle and plug units. The rolling seals are rotatable back and forth between a closed position sealing one or more chambers within the respective units which contain one or more contacts and an open position in which bores through the seals are open to allow contacts in one unit to pass through the seal openings and engage contact in the other unit. Actuators automatically rotate the rolling seals into the open position during mating and back into the closed position on de-mating. At least one actuator assisting device is located in at least one of the units and associated with the rolling seal in that unit to bias the seal back to the closed position during de-mating.

36 Claims, 24 Drawing Sheets

(56) References Cited

U.S. PATENT DOCUMENTS

| | | |
|---|---|---|
| 4,948,377 A | 8/1990 | Cairns |
| 5,171,158 A | 12/1992 | Cairns |
| 5,194,012 A | 3/1993 | Cairns |
| 5,217,391 A | 6/1993 | Fisher, Jr. |
| 5,234,350 A | 8/1993 | Marechal |
| 5,645,438 A | 7/1997 | Cairns |
| 5,738,535 A | 4/1998 | Cairns |
| 6,017,227 A | 1/2000 | Cairns |
| 2005/0002617 A1* | 1/2005 | Nicholson ............ 385/53 |

FOREIGN PATENT DOCUMENTS

| | | |
|---|---|---|
| GB | 2166261 A | 4/1986 |
| WO | 96/22554 A2 | 7/1996 |
| WO | 97/33348 A1 | 9/1997 |
| WO | 03/048827 A2 | 6/2003 |

\* cited by examiner

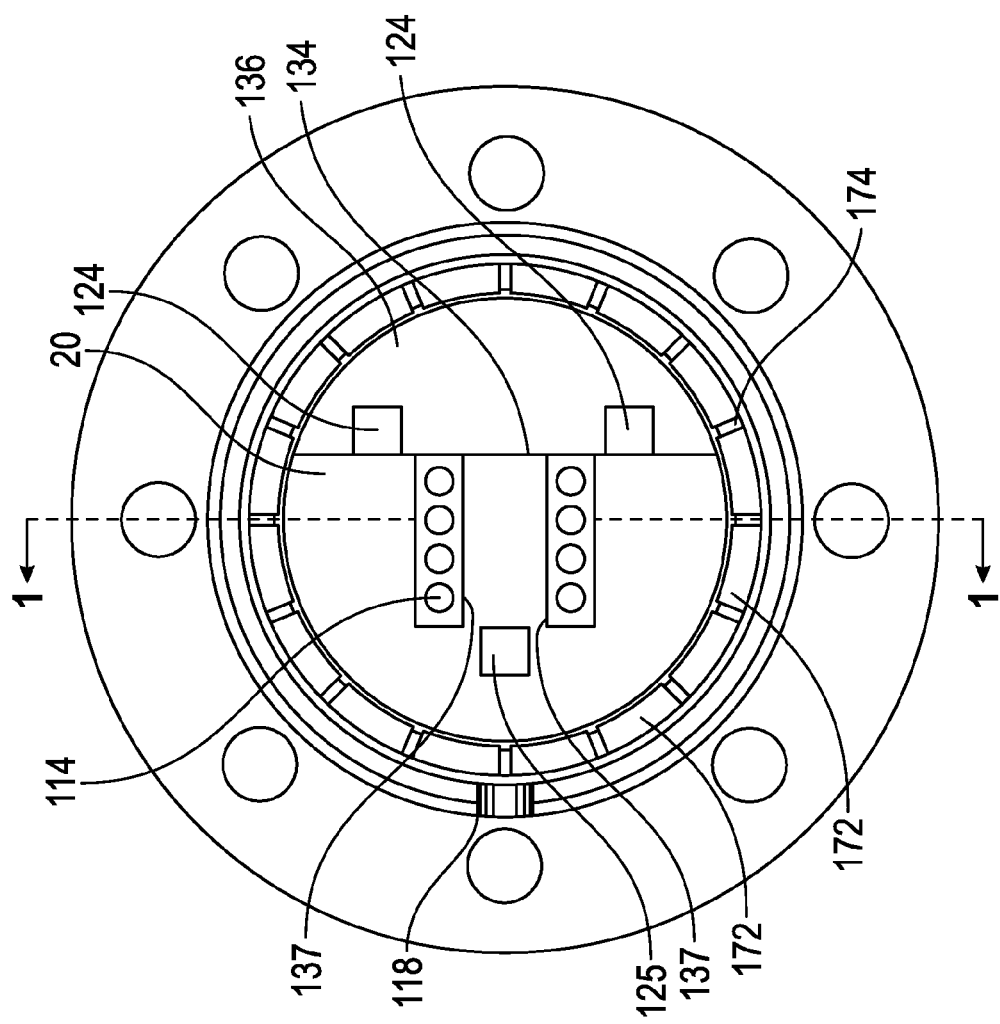
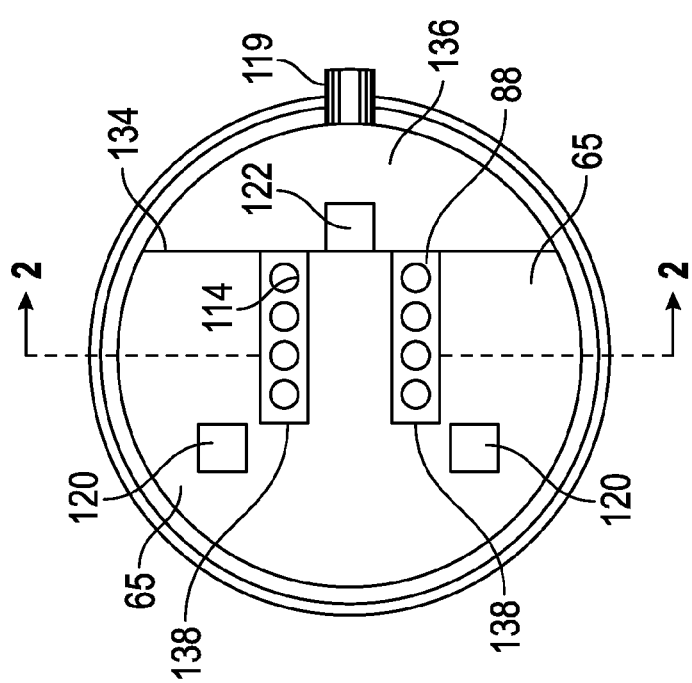
FIG. 5
FIG. 4

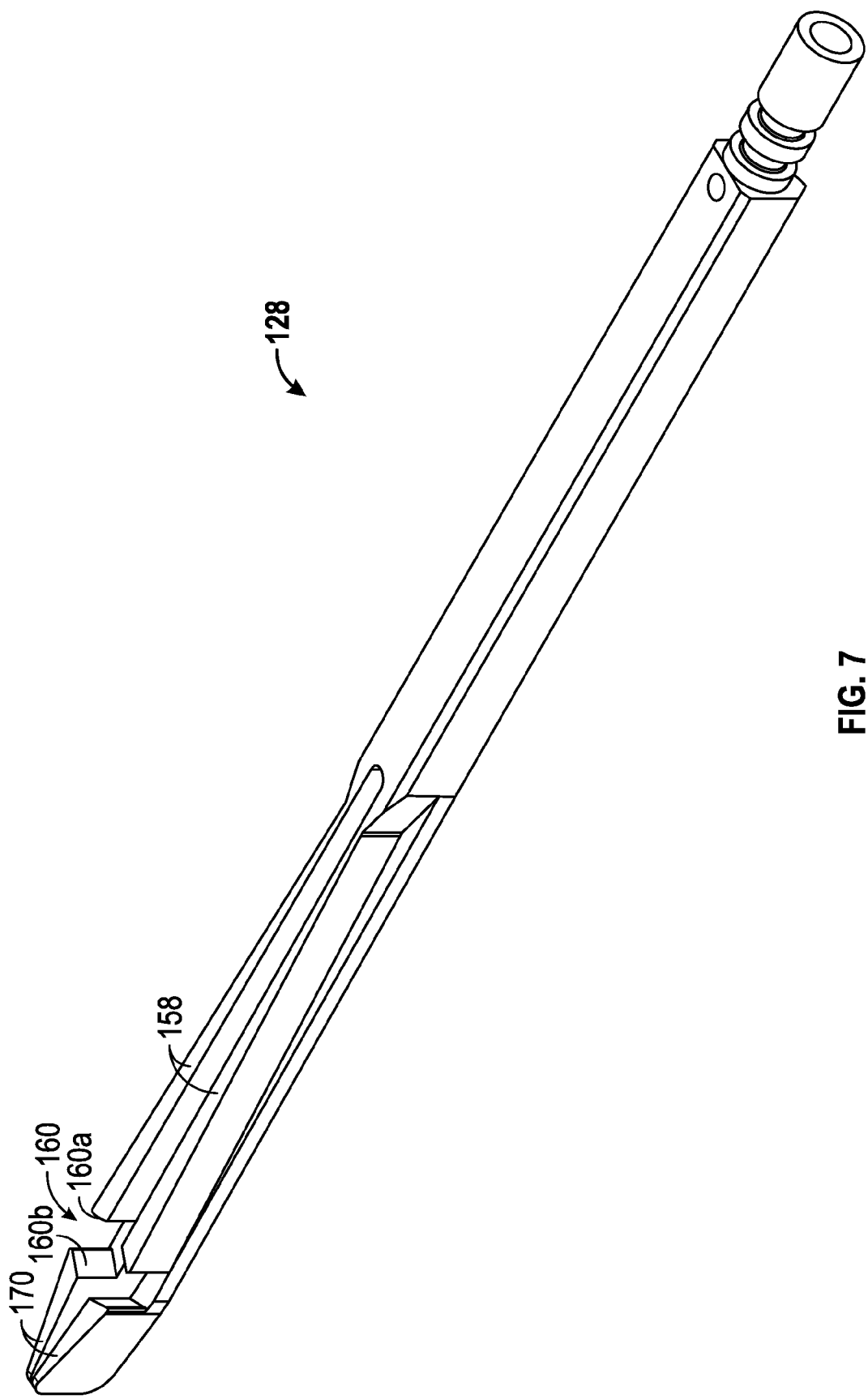

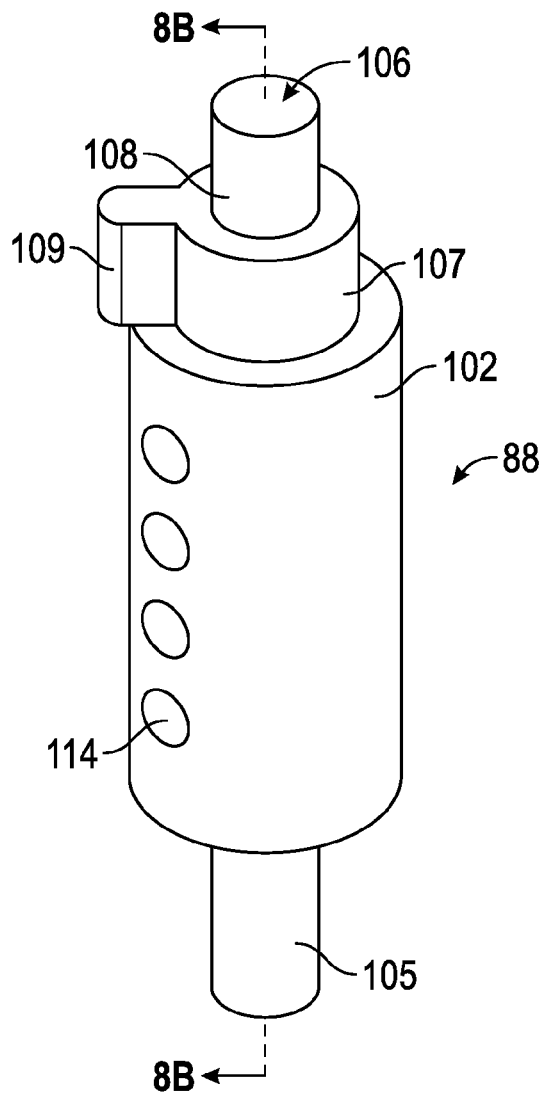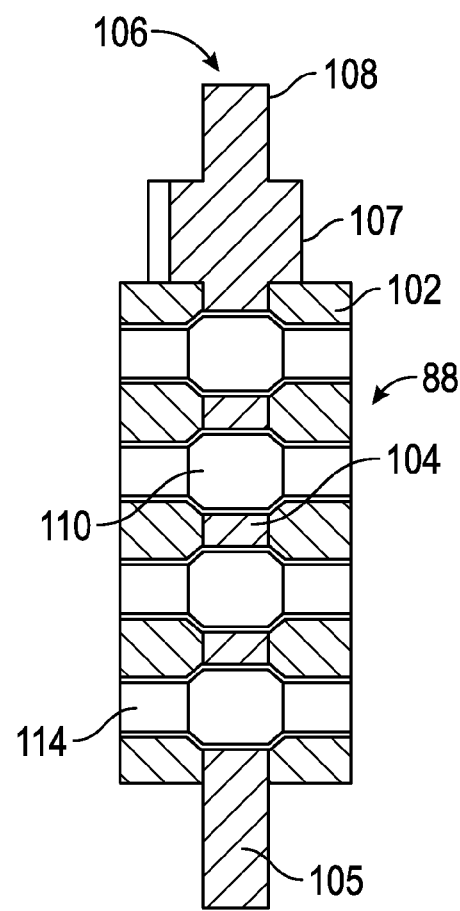
FIG. 8A
FIG. 8B

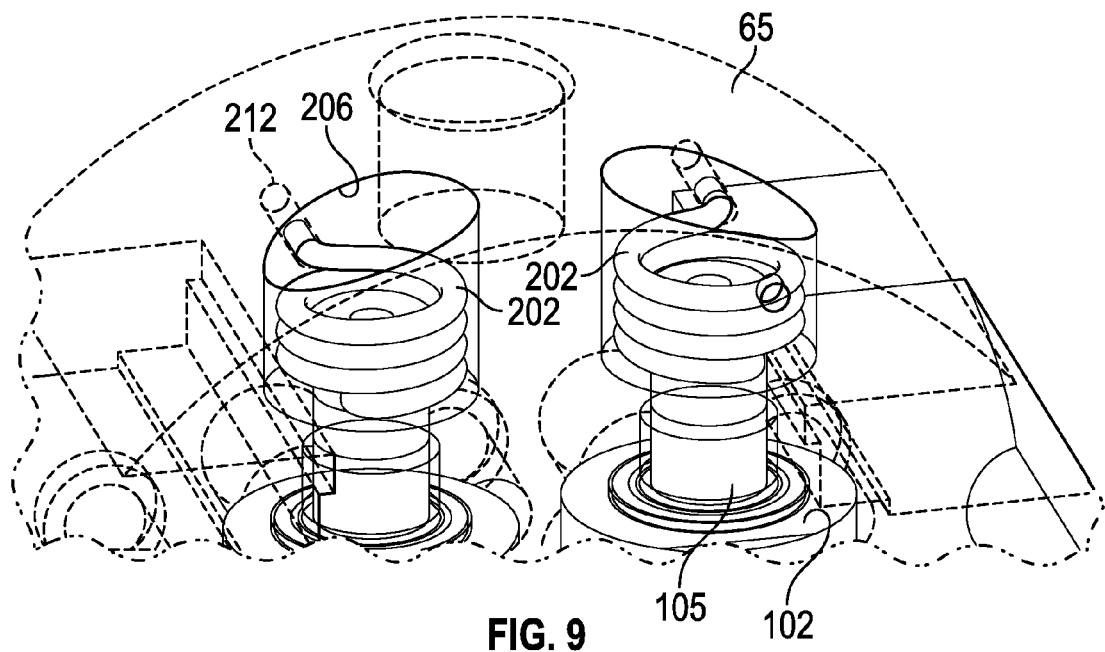
FIG. 9
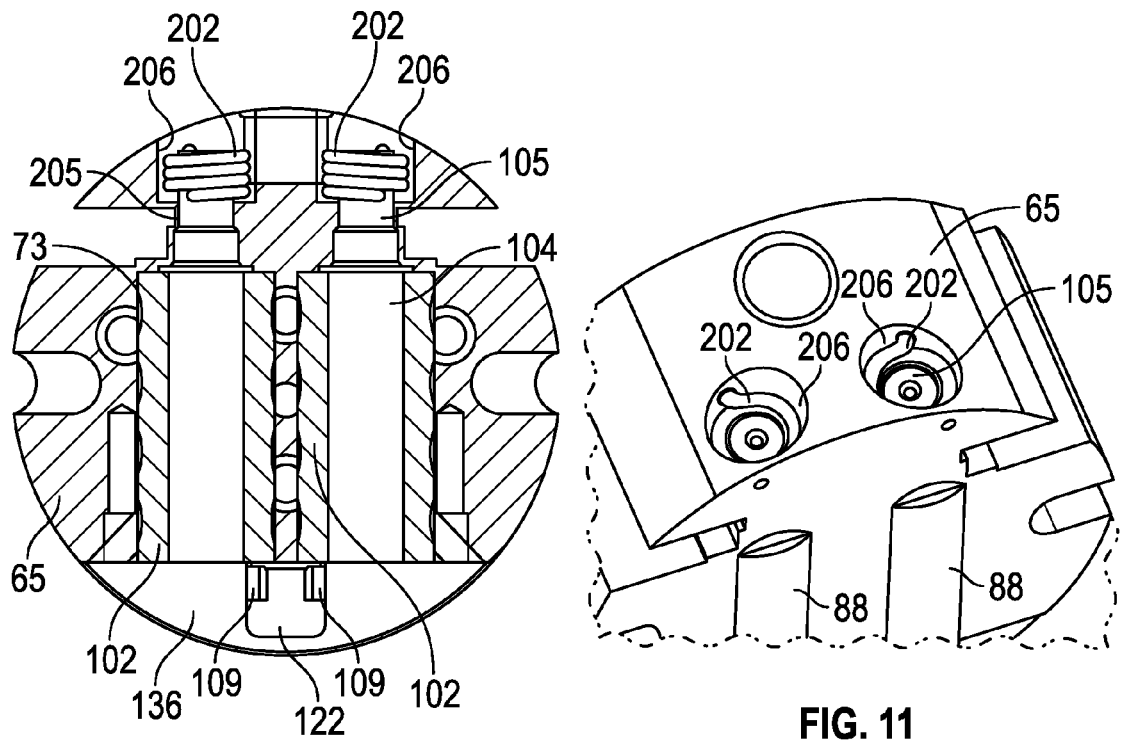
FIG. 10
FIG. 11

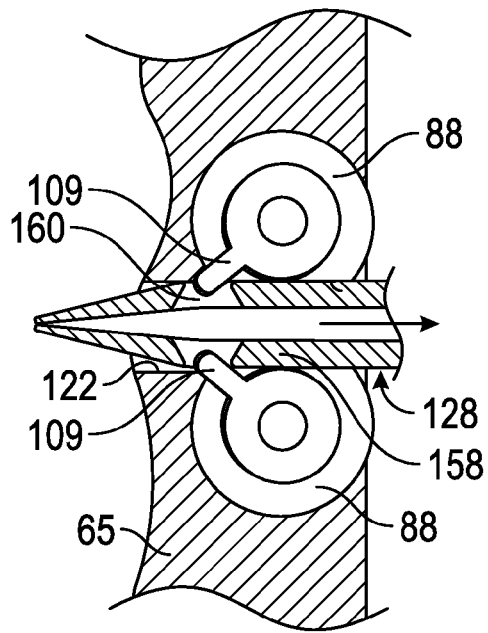
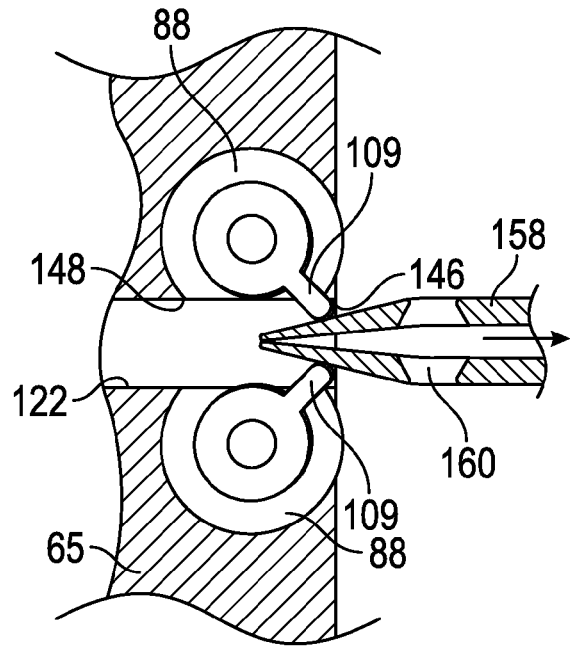
FIG. 13E FIG. 13F
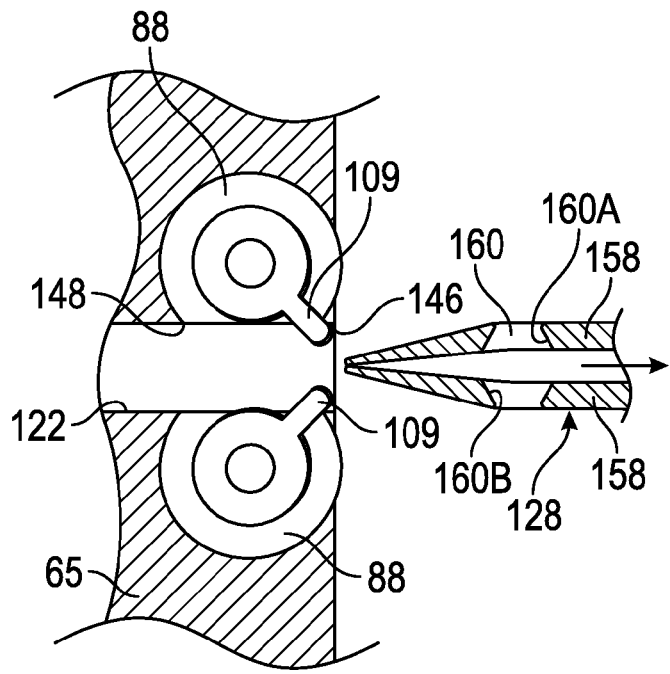
FIG. 13G

HARSH ENVIRONMENT CONNECTOR WITH SEAL CLOSURE ASSISTING DEVICE

BACKGROUND

1. Field of the Invention

The present invention relates generally to an electrical, optical, or electro-optical connector for use in harsh environments such as subsea environments, and is particularly concerned with seal closure actuation in such connectors.

2. Related Art

There are many types of connectors for making electrical and fiber-optic cable connections in hostile environments. One type includes connectors for undersea mating and de-mating. Such underwater connectors typically comprise a plug unit containing one or more contact probes and a receptacle unit containing an equivalent number of receptacle contacts or junctions for engagement with the contact probes, which extend into the receptacle unit when the units are connected together. Typically, the contacts or junctions are contained in a sealed chamber containing dielectric fluid, and the probes enter the chamber via one or more normally sealed openings. One major problem in designing such units is the provision of seals which adequately exclude seawater from the contact chamber even after repeated mating and de-mating, and also prevent dielectric fluid from leaking out of the chamber.

A number of different sealing mechanisms have been proposed in the past for achieving this objective. One such sealing mechanism has an opening into the contact chamber which comprises an elastomeric tubular entrance surrounded by an elastomeric sphincter which pinches the entrance closed upon itself when the plug and receptacle units are in an unmated condition. In the mated condition, the sphincter pinches against the entering probe to form a seal. Although this type of seal is successful in some cases, it does have disadvantages. One disadvantage is that this seal does not work well under all hostile conditions. Another disadvantage is that such seals tend to lose their "memory" after repeated mating and de-mating, so that they may fail to close completely, or may not close quickly enough to isolate the chamber from the surrounding environment when the units are de-mated. Another type of known seal mechanism comprises a piston which moves axially into the seal opening as the units are de-mated.

Underwater electro-optical connectors are described in U.S. Pat. Nos. 4,616,900 and 4,666,242 of Cairns. In U.S. Pat. No. 4,666,242, the male and female connector units are both oil filled and pressure balanced. This device utilizes a penetrable seal element having an opening which pinches closed when the units are separated. Other known fiber-optic connectors have similar seals which are not suitable for use under some conditions and may tend to lose effectiveness after repeated mating and de-mating.

Some prior seal mechanisms are not completely effective in providing repeatable, reliable optical and electrical connections in adverse environments while maintaining electrical or optical contacts or terminals in isolated chambers at all times. Optical connectors can be expensive and generally require complicated means for terminating the connector elements or junctions to the cables they are intended to connect.

So called rolling seal connectors, such as the connector described in U.S. Pat. No. 6,017,227 of Cairns et al., are harsh environment or underwater connectors in which dielectric fluid filled contact chambers in the plug and receptacle units are sealed at the forward ends of the connectors by rolling seals which have through bores aligned with respective bores in the two units in the mated condition, and offset from the bores connected to the contact chambers so as to seal the chambers in the unmated condition. One or more actuators in one of the units are designed to extend into the other unit on mating and to engage with seal actuator tabs in both units during mating to roll the seals from the closed to the open position. The same actuators are designed to engage the seal actuator tabs in the opposite direction during de-mating, to roll the seals back into the closed, sealed condition. There is a risk that an actuator may become deformed if used improperly, in which case the seals may not return completely to the closed position.

SUMMARY

Embodiments described herein provide for a connector having plug and receptacle units with rolling seals having an actuator assisting device to assist in seal closure during de-mating of the connector units.

According to one aspect, a connector assembly is provided which comprises a mateable plug unit and receptacle unit, the receptacle unit having a first end and a second, mating end, at least one bore extending inwardly from the mating end of the receptacle unit and having an enlarged, recessed seat at the mating end, a receptacle contact element mounted in the bore, a seal member movably mounted in the seat portion, the seal member having a through bore and being movable in a non-axial direction relative to the axis of the receptacle unit between a first, closed position in which the through bore is offset from the receptacle bore and the end of the receptacle bore is sealed, and a second, open position in which the seal through bore is aligned with the receptacle bore, a seal biasing device associated with the seal member which urges the seal member towards the closed position, the plug unit having a first end and a second, mating end for engagement with the second end of the receptacle unit, the second end of the plug unit having at least one opening aligned with the bore in the receptacle unit and a contact element slidably mounted in the plug unit for projecting out of the opening and through the seal member bore into the receptacle unit bore to contact the receptacle contact element when the seal member is in the open position. At least one actuator rod is secured in one of the units for projecting through an aligned bore in the other unit when the units are mated together, the actuator rod having an actuator for moving the seal member back and forth between the first and second positions.

The biasing device is an actuator assisting device which assists in seal closure during de-mating of the connector units, to reduce the risk of insufficient seal closure due to potential deformation of the actuator rod as a result of improper connector mating technique, and provides a measure of redundancy in the connector. In one embodiment, the biasing device may be a torsion spring or a clock spring engaging over an extended end of a seal member axle and acting between the seal member and a seal axle seat in a manifold block in the front end of the receptacle unit.

In one embodiment, the plug unit has an identical recessed seat at its mating end at the plug contact bore opening and a matching seal member movably mounted in the seat, the seal member having a through bore and being movable between a closed position in which the through bore is offset from a plug bore in which the contact element is mounted, and an open position in which the through bore is aligned with the plug bore. An additional actuator rotates the plug seal member between the closed and open positions when the units are mated, and back into the closed position on de-mating. If necessary, an additional biasing member may be provided to bias the plug seal member back into the closed position.

The seal member may be disc-shaped or spherical, but in one embodiment each seal member is cylindrical. Each cylindrical seal member is rotatably mounted in the respective seat for rotation about its longitudinal axis, and the through bore extends transversely through the longitudinal axis. Thus, the seal members roll from the closed to the open position as the units are connected together. The seal members are preferably of slightly larger dimensions than the cylindrical dimensions of the seat, so that they are compressed slightly to form a better seal.

In one embodiment, each seal member has a radially projecting tab, and at least two actuators are provided for engaging the tabs of the respective seal members to open and close them as the units are mated and de-mated, respectively. Thus, each seal member is positively actuated to roll from the closed to the open position, and back from the open to the closed position. This provides a more reliable, positive engagement between each actuator and seal member. The addition of the actuator assisting or seal biasing device provides additional reliability in seal closure in the event of damage or deformation of the actuator.

In one embodiment, the receptacle unit has a series of parallel bores each containing a contact element in a receptacle body, and each of the bores terminates in the same recessed area in a front face of the body. The seal member has a series of transverse, parallel through bores extending across its diameter at spacings matching the spacing between the receptacle unit bores. The seal member is rotatably retained in the recess so that a portion of the seal projects outwardly through the outwardly facing opening. One or more such seal members may be rotatably mounted in matching recesses in the front face of the receptacle and plug units, depending on the number of contacts to be made in the connection. Where there are two or more rolling seals or seal members in each of the units, at least each seal member in one of the units, for example the receptacle unit, is associated with an actuator assisting device or biasing device to urge the seal member back into the closed position on de-mating, assisting operation of the actuator rod and improving reliability of seal closure. In one embodiment, where there are two or more seal members in the front face of the receptacle unit, separate actuator rods (one for each seal member) engage in an actuator bore and are configured to engage and roll respective seal members between closed and open positions on mating and between open and closed positions on de-mating. Alternatively, a single actuator rod may have oppositely directed actuating formations configured to engage and roll two receptacle seal members between closed and open positions on mating and between open and closed positions on de-mating. In either case, the biasing devices associated with each receptacle rolling seal help to urge the rolling seals into a fully closed position in case the actuator rod or rods are deformed or damaged such that they do not fully roll the seals into the closed and sealed positions.

Other features and advantages of various embodiments will become more readily apparent to those of ordinary skill in the art after reviewing the following detailed description and accompanying drawings.

BRIEF DESCRIPTION OF THE DRAWINGS

The details of various embodiments of a harsh environment connector, both as to its structure and operation, may be gleaned in part by study of the accompanying drawings, in which like reference numerals refer to like parts, and in which:

FIG. 4 is an end elevational view of the mating end face of the receptacle unit in the mated position, with the rolling seals in an open condition;

FIG. 5 is an end elevational view of the mating end face of the plug unit in the mated position;

FIG. 7 is a perspective view of a center actuator rod of the plug unit which enters the receptacle unit manifold between the seals during mating to engage and roll the receptacle seals into the open position;

FIG. 8A is a perspective view of one of the rolling seals of FIG. 6 with the actuator assisting device removed;

FIG. 8B is a cross-sectional view of the rolling seal on the lines 8B-8B of FIG. 8A;

FIG. 9 is a perspective view of the biased dual rolling seal assembly of the receptacle unit of FIGS. 2, 3, 5, 7 and 8 with actuator assisting devices associated with each rolling seal, with part of the manifold block shown in dotted outline to illustrate the extended seal axles and associated biasing springs;

FIG. 10 is a partial cross-sectional view of the receptacle manifold block illustrating the rolling seal mounting seats and axle receiving bores at one end of the rolling seals;

FIG. 11 is a partially cut away side perspective view of the receptacle front end manifold block illustrating the bores or seats receiving the biasing springs and end portions of the rolling seal axles on which the springs are mounted;

FIGS. 13A to 13G are partial sectional views of the receptacle unit rolling seals and the center actuator rod of FIGS. 6A and 6B extending from the plug unit into the aligned bore in the receptacle unit at successive positions during mating and de-mating as the seals are rolled back and forth between a fully closed position and a fully open position;

DETAILED DESCRIPTION

Figure 1:
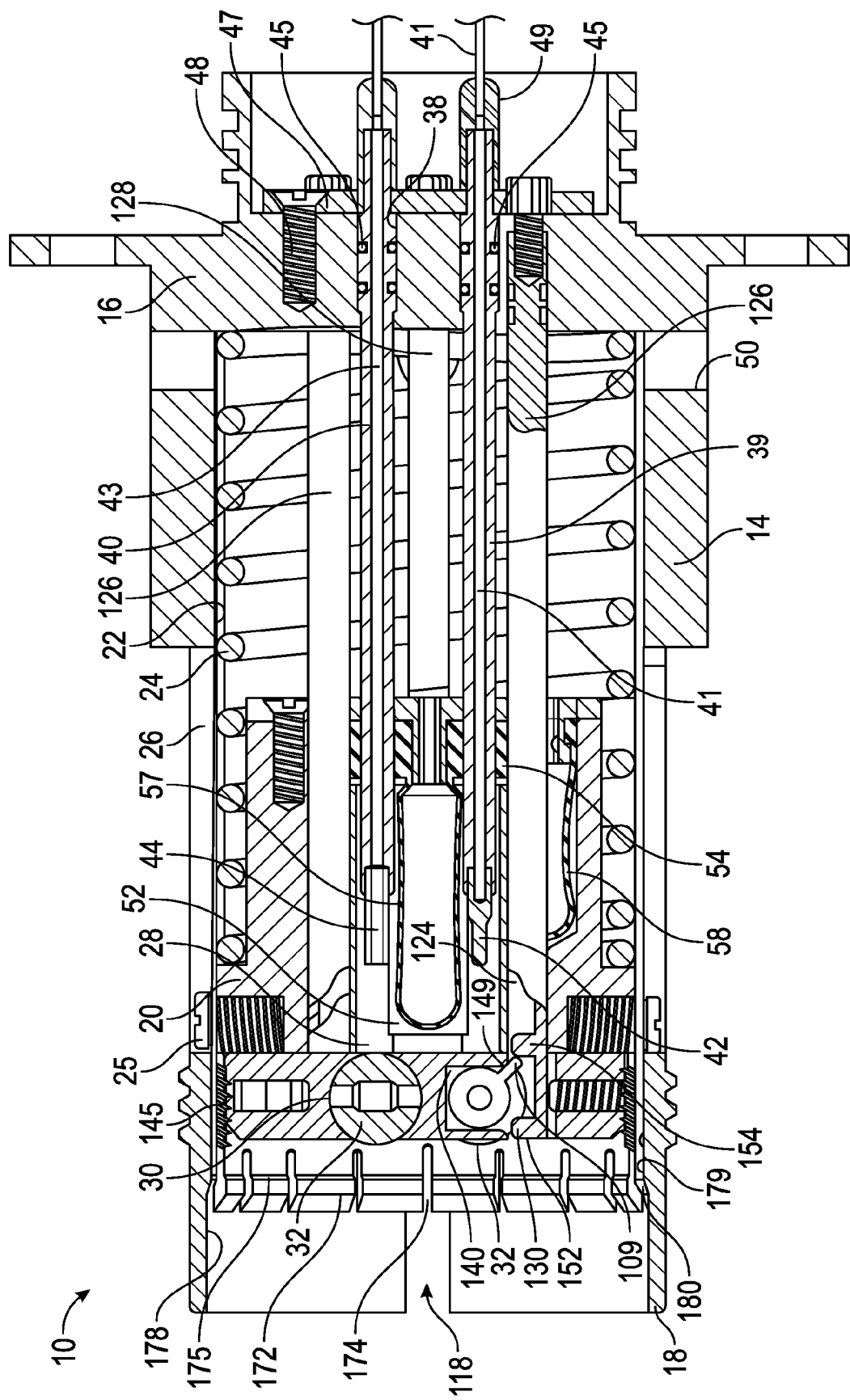
FIG. 1 is a longitudinal sectional view of a fixed bulkhead or plug unit of a rolling seal connector, shown in an unmated condition with the rolling seal members in the front face in a closed, sealed position.

Certain embodiments as disclosed herein provide for a rolling seal connector with an actuator assisting device or mechanism which assists actuation of the rolling seals, in particular closure of the rolling seals on de-mating.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

The drawings illustrate embodiments of a two part underwater connector for connecting optical, electrical, or electro-optical cables. The parts comprise a fixed bulkhead or "plug" unit and a receptacle unit for releasable mating engagement with the plug unit. In the first embodiment of FIGS. 1 to 13G, the connector is a hybrid electro-optical connector designed for making both electrical and fiber-optic connections. In the second embodiment of FIGS. 14 to 25 the connector is an optical connector designed for making fiber-optic connections. However, it will be understood that the connectors may be modified for making only electrical connections, only fiber-optic connections, or hybrid electro-optic connections. Additionally, embodiments of an eight-way connector and a twelve way connector are illustrated by way of example only, and it will be understood that the connector may alternatively be designed for making a greater or lesser number of connections, depending on the application. The connector may be used for making connections in any harsh environment, not only underwater or at great ocean depths, although it is particularly intended for use in underwater applications.

The connectors of the following embodiments are rolling seal connectors for use in a harsh environment or underwater connector in which contact chambers in the plug and receptacle units are sealed at the forward ends of the connectors by rolling seals which have through bores aligned with respective bores in the two units in the mated condition, and offset from the bores connected to the contact chambers so as to seal the chambers in the unmated condition. The contact chambers contain contacts aligned with the respective seal through bores in the mated condition, with the contacts in one unit extending through the respective aligned seal through bores to engage corresponding contacts in the chamber or chambers in the other unit. The contact chambers in each embodiment may be pressure balanced, dielectric fluid filled chambers. One or more actuators in one of the units are designed to extend into the other unit on mating and to engage with seal actuator tabs in both units during mating to roll the seals from the closed to the open position. The same actuators are designed to engage the seal actuator tabs in the opposite direction during de-mating, to roll the seals back into the closed, sealed condition.

Figure 2:
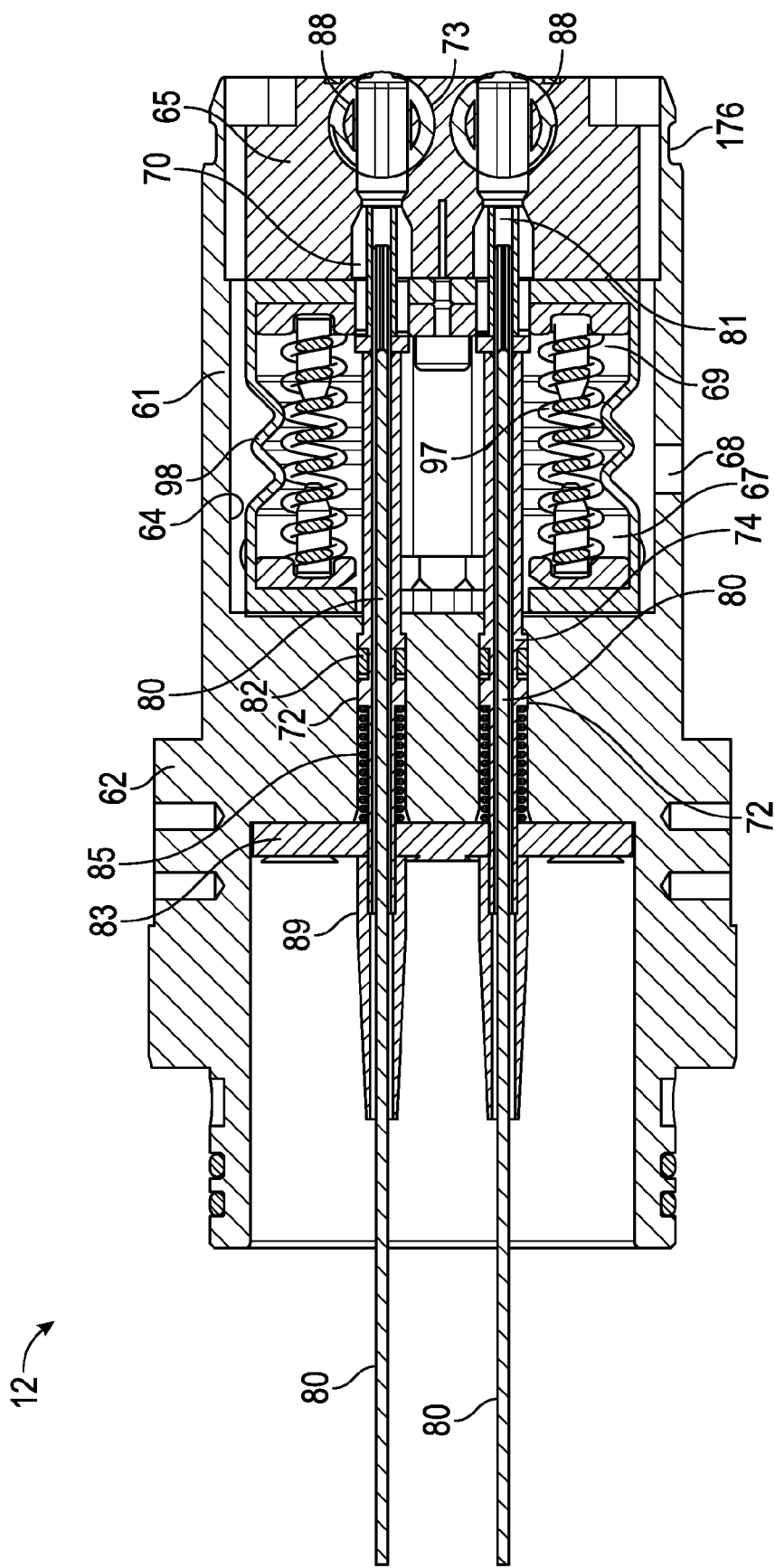
FIG. 2 is a longitudinal sectional view of a receptacle unit for mating engagement with the plug unit of FIG. 1, shown in an unmated condition with the rolling seal members in the front face in a closed, sealed position.
Figure 3:
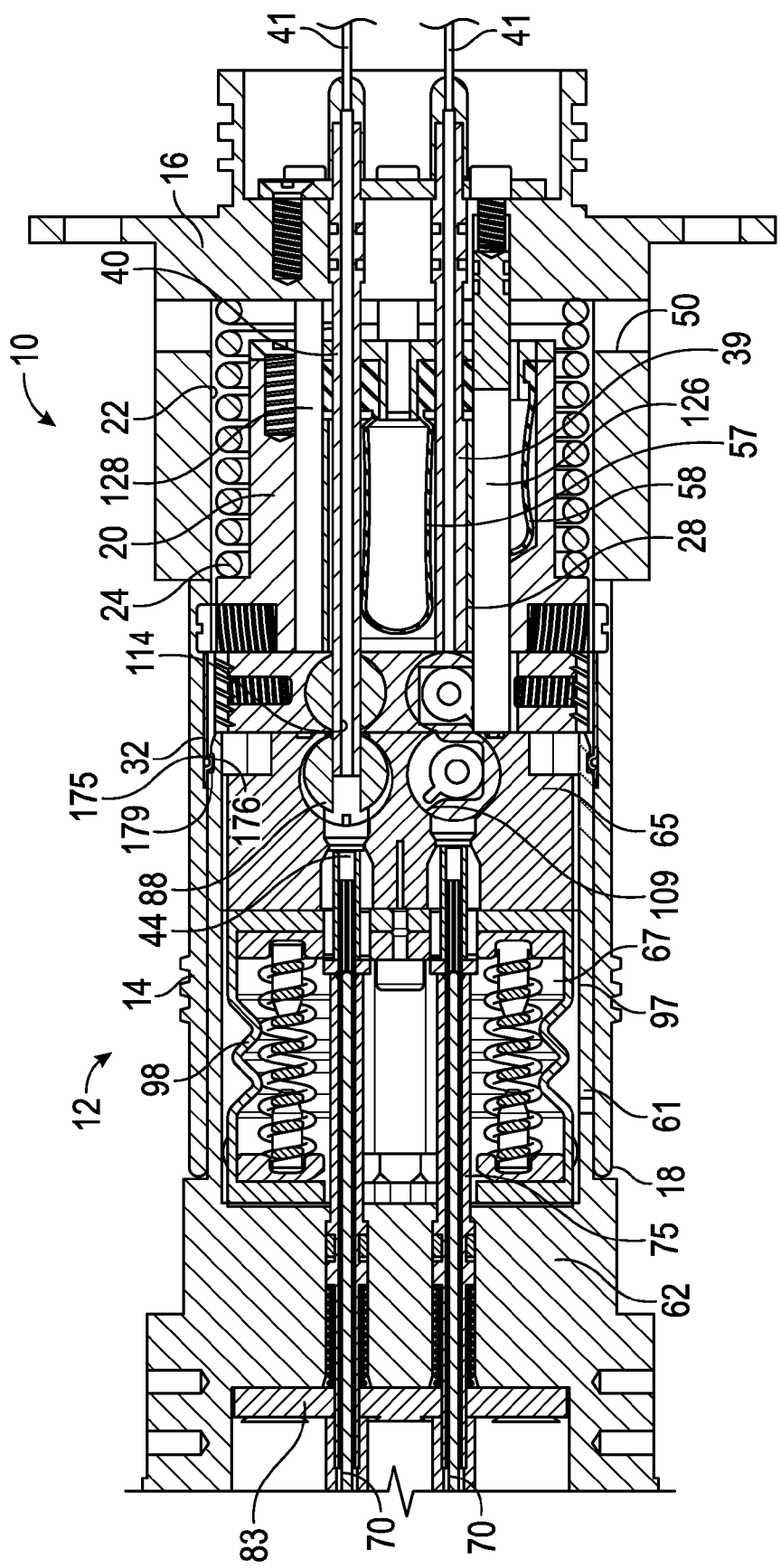
FIG. 3 is a longitudinal sectional view of the plug and receptacle units of FIGS. 1 and 2 in the fully mated and connected positions, with the rolling seal members rotated into an open condition and plug contacts extending through the aligned openings into the receptacle unit for contact with corresponding receptacle contacts in the receptacle contact chamber.

In one embodiment, a harsh environment connector comprises a plug unit 10 as illustrated in FIG. 1 and a receptacle unit 12 as illustrated in FIG. 2 which interconnect to form an integral cylindrical connector as illustrated in FIG. 3. The connector in this embodiment has some elements in common with the rolling seal connector described in U.S. Pat. No. 6,017,227 of Cairns, the contents of which are incorporated herein by reference, but has a modified seal actuator mechanism which includes actuator assisting devices 200 and modified seal axles as illustrated in FIGS. 6 to 13G for assisting operation of the rolling seals 88 in the receptacle unit 12, along with modified axle mounting bores, a modified receptacle manifold block and modified seal actuators, as described in more detail below. The drawings illustrate one embodiment of a manifold block arranged to mount or receive the rolling seals, axles, actuator rods, and actuator assisting devices 200, but it will be understood that other mounting arrangements may be used in alternative embodiments.

The plug unit 10 comprises an outer cylindrical shell 14 of rigid material having a sealed rear end wall 16 and an open forward end 18. A plug contact manifold or front end portion 20 of rigid material is slidably mounted in plug chamber 22 and is biased or pre-loaded by biasing spring 24 into the forward position illustrated in FIG. 1. Key pins 25 projecting outwardly from manifold 20 extend into axially extending keyways or slots 26 on the inner wall of shell 14 to prevent rotation of manifold 20 while allowing it to move axially.

The plug manifold has a series of parallel through bores or passageways 28 extending from the rear end to the forward end of the manifold. The number of bores depends on the number of connections to be made, which in this case is eight, although a greater or lesser number may be provided, depending on the number of connections to be made. Four of the bores are located in a line in one half of the manifold block 20, and the other four are located in a line in the other half of the manifold, as best illustrated in FIG. 5. The bores terminate in a pair of parallel, part-cylindrical recesses or rolling seal seats 30 located in the front face of the manifold, with four bores terminating in one recess and the other four bores terminating in the other recess. A pair of rolling seal devices 32 are rotatably mounted in the respective recesses 30.

A series of through bores 38 in the shell end wall 16 are each aligned with a respective one of the manifold through bores 28. A series of electrical lead housings 39 and optical fiber housings 40 defining contact chambers project through respective aligned bores 38, 28. Optical fibers 43 pass through the bores of optical fiber housings 40 and terminate to alignment ferrules 44 which are secured in seats at the end of the respective tubular housing 40. An electrical lead or wire 41 projects through each of the electrical housings 39 and terminates in an electrical contact pin 42. Each of the housings 39 and 40 is sealed via O-ring seals 45 to the respective bore 38 in the end wall 16. A backing plate 47 is secured over the rear end wall and housings 39 and 40 via mounting screws 48, and the assembly forms an impermeable high pressure barrier at the terminal end of the plug unit. A rubber strain relief member or boot 49 is secured over the projecting end of each housing 39, 40 and port of the electrical or optical lead on the outside of plate 47.

Dielectric fluid fills the forward end of each of the bores 28. Flexible bladders 57, 58 provide pressure compensation between the pressure of fluid inside and outside the seal unit by flexing inwardly or outwardly as appropriate.

The mating receptacle unit 12 also has a rigid outer shell 61 having a terminal or rear end wall 62 and a cylindrical bore 64 projecting inwardly from the forward end. A receptacle manifold block or front end portion 65 of rigid material is secured in the bore 64 in shell 61 via suitable retaining screws (not illustrated), leaving a chamber 67 between the rear end of block 65 and the end wall 62, which communicates with the exterior of the unit via vent port 68.

A series of through bores or passageways 70 extend through the manifold block 65, terminating in a pair of part-cylindrical seats or recesses 73 at the forward end of block 65. Rolling seal devices 88 are rotatably mounted in each of the seats 73 to seal the open forward ends of bores 70 in the closed position illustrated in FIG. 2. The number of through bores corresponds to the number of connections to be made, as discussed above, and in this case four parallel bores are provided in one half of the manifold as viewed in FIG. 2, and four bores in the other half, as best illustrated in FIG. 4. Aligned through bores 72 are provided in rear end wall 62, and electrical and/or optical tubular housings or guide tubes 74 project through bores 72 and into aligned bores 70, as illustrated in FIG. 2.

Optical fibers 80 pass through the bores of tubular housings 74 and terminate to alignment ferrules 81 which are secured in seats at the end of the respective tubular housings 74. Connections of the fiber to the alignment ferrules are made using standard epoxy and polish techniques. The rear end of the receptacle shell is suitably threaded or provided with other securing devices for connecting it to the end of a coaxial optical cable carrying optical fibers which are suitably connected to fibers 80. Although optical fibers only are illustrated in FIG. 2, in a hybrid connector electrical leads pass through the bores of some or all of the tubular housings and terminate in an electrical socket for receiving electrical contacts 42 of mating plug unit 10 (see FIG. 1). Annular Morrison seals 82 are provided between each tubular housing 74 and the respective rear end wall bore 72 to seal the end wall.

A backing plate 83 is secured over the rear end wall and housings 74 via mounting screws, and the assembly forms an impermeable high pressure barrier at the terminal end of receptacle unit. Springs 85 installed in counterbore portions of bores 72 are held in place by the backing plate 83, and bias the electrical sockets and optical ferrules outwardly. Rubber strain relief members or boots 89 are sealed over projecting portions ends of the electrical and optical leads outside backing plate 83.

A pressure compensation bladder 98 surrounds all of the contact guide tubes or housings 74 in the chamber 67 and extends between the rear end wall 62 and the manifold block 65, forming an internal contact chamber 69 which is filled with a dielectric optically clear fluid, as illustrated in FIG. 2. Biasing springs 97 act between opposite ends of the bladder to press the rear end of the bladder firmly against the adjacent inner wall of the rear part 62 of the connector shell.

When the plug and receptacle units are mated as in FIG. 3, the rolling seals are rotated into the open position while the plug manifold block is urged inwardly so that the plug contact elements project out through the open plug seals and aligned receptacle seals for engagement with the corresponding receptacle contact elements. FIGS. 4 and 5 illustrate the mating end faces of the plug and receptacle units, respectively, with the rolling seal ports 114 in the open position of FIG. 3. The plug shell has an axial keyway 118 extending from its end face, while the receptacle has an alignment key 119 which engages in the keyway to ensure that the parts are accurately oriented relative to one another on mating. The key and keyway also prevent relative rotation between the ports as they are connected together. Two actuator rod ports or passageways 120 of square section project inwardly through the end face of the manifold block 65 on one side of the rolling seal assembly, while a third port or passageway 122 of square section extends inwardly on the opposite side of the seal assembly at a location between the two rolling seals. Corresponding passageways 124,125 are provided at equivalent locations on the mating end face of the plug manifold block, such that the passageways 124 are aligned with ports or passageways 120 while the passageway 125 is aligned with port or passageway 122 when the two units are connected together. Passageways 124,125 extend through the entire plug manifold body. As best illustrated in FIG. 1, a pair of actuator rods 126 is fixed in the base or end wall 16 of the plug shell and the rods extend slidably through respective passageways 124, and are of corresponding square cross-section. A third actuator rod 128 (illustrated in more detail in FIG. 7) is fixed at one end in end wall 16 and extends slidably through passageway 125 between the rolling seals 32, and is of corresponding square cross-section to the passageway.

Each of the manifold blocks 20,65 is formed in one piece apart from a cut-out segment in the front end of each manifold block which has a chord 134 (see FIGS. 4 and 5) intersecting one end of each of part-cylindrical seats or recesses 30, 73 (see FIGS. 1 and 2) in which the respective rolling seals are mounted. As seen in FIGS. 4, 5 and 10, corresponding segment-shaped part 136 is designed to fit into the cut-out segment after installation of the rolling seals into the two recesses 30 or 73 in the front ends of the plug and receptacle manifold blocks, respectively.

The cylindrical recesses or rolling seal seats 30, 73 each have a slot shaped opening 137 (see FIG. 5) and 138 (see FIG. 4) respectively, in the end face of the respective manifold block. A counterbore at one end of each recess in the main body 65 of the receptacle is designed to receive the end portion or axle 105 of each rolling seal, and a pair of stepped diameter bores or chambers (not visible in the drawings) with open ends at the mating end face of part 136 are designed to receive the opposite end portions 106 of each of the rolling seals. The rolling seals in the plug manifold are oriented in the opposite direction, with each end portion or axle 105 received in a counterbore in the part 136, and the opposite end portion 106 received in counterbores in the main body 20.

Figure 6:
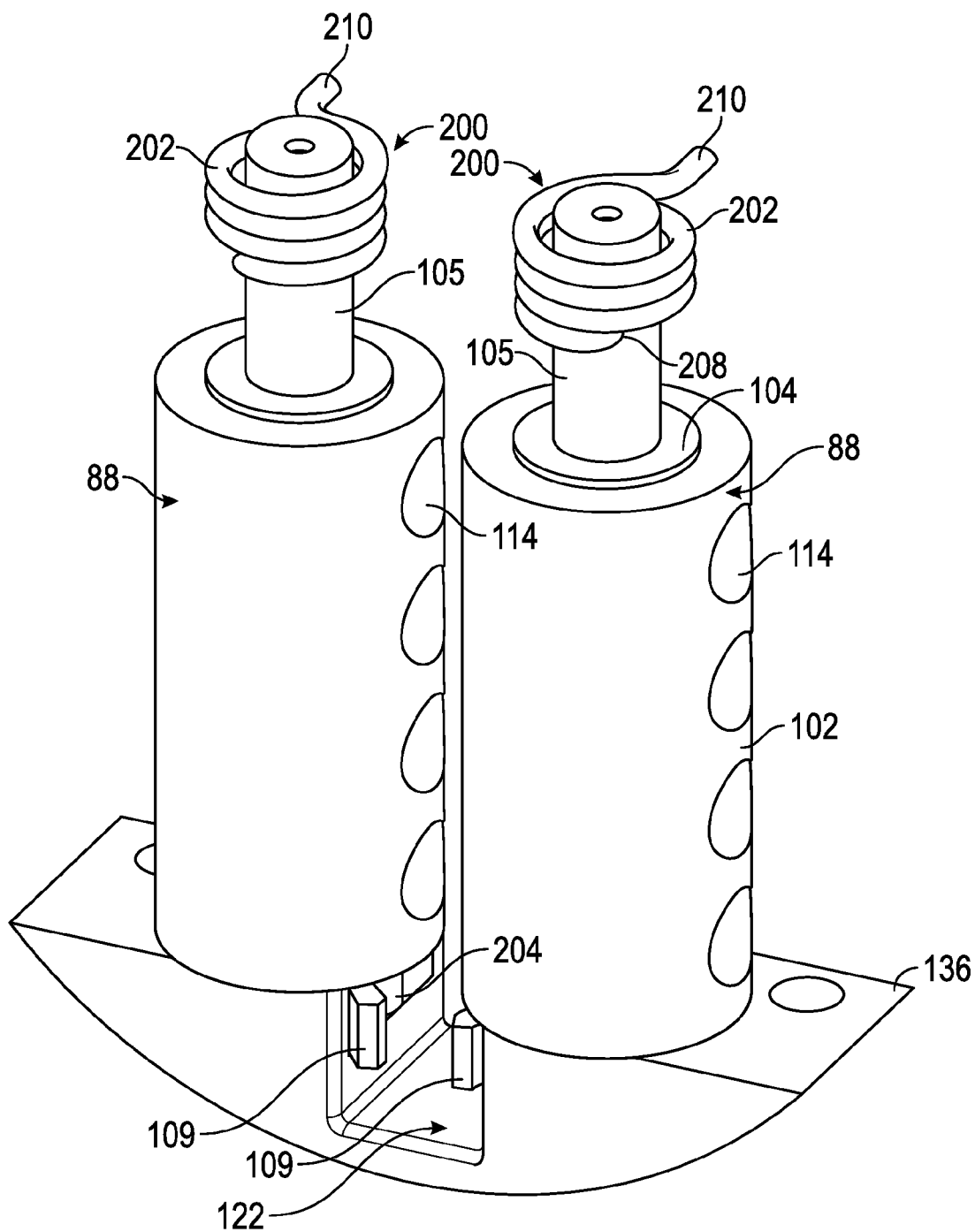
FIG. 6 is a perspective view of one embodiment of the dual rolling seals with actuator assisting devices incorporated in the manifold block of the receptacle unit of FIGS. 2 and 3, with part of the manifold block removed to reveal details of the seals and the actuator assisting devices.

The rolling seals 88 of the receptacle unit are illustrated in more detail in FIGS. 6 to 8, where they are shown separate from the remainder of the receptacle unit. In one embodiment, each receptacle rolling seal comprises a rigid core or axle over which an elastomeric roller or sleeve 102 is molded or otherwise affixed. The axle, which is of metal or hard plastic, has a central portion 104 over which sleeve 102 is molded, and first and second axle end portions 105,106 projecting from opposite ends of sleeve 102.

End portion 106 has a first, larger diameter portion 107 and a smaller diameter end portion 108. A radial tab or tooth 109 projects from the first portion 107. The elastomeric sleeve 102 has through bores 114 as illustrated in FIGS. 8A and 8B. In the receptacle seals, the first axle end portion 105 is extended and an actuator assisting or biasing device 200 is mounted over the end portion 105 as seen in FIGS. 6 and 9 to 11. In this embodiment, biasing device 200 comprises a torsional spring 202, but other types of spring or other biasing devices may be used in other embodiments. The plug seals 32 are identical to the receptacle seals apart from the extended part of axle end portion 105, since no actuator assisting devices are provided in the plug unit in this embodiment. If needed in alternative embodiments, the plug seals 32 may be modified to allow for mounting of actuator biasing devices on the plug seal axle shafts as well as on the receptacle actuator shafts.

The main body of each rolling seal 88 is rotatably engaged in the matching seat 73 in the front face of receptacle manifold block 65, as best illustrated in FIGS. 4, 10 and 11, while the axle end portions 105, 106 are rotatably mounted in corresponding counterbores in the receptacle manifold at opposite ends of each recess 73. Only segment-shaped part 136 of the manifold block which receives axle end portions 106 carrying actuator tabs 109 is shown in FIG. 6, to reveal the actuator assisting torsional springs 202 on opposite axle portions 105. The axle end portions 106 are rotatably mounted in corresponding seats or counterbores in segment-shaped part 136, and the counterbores communicate with opposite sides of port or passageway 122 extending inwardly through the outer end face of the manifold block via openings or slots 204 (see FIGS. 6 and 10). The radial tabs 109 project into opposite sides of passageway 122, as best seen in FIGS. 2, 6 and 10.

Figure 12A:
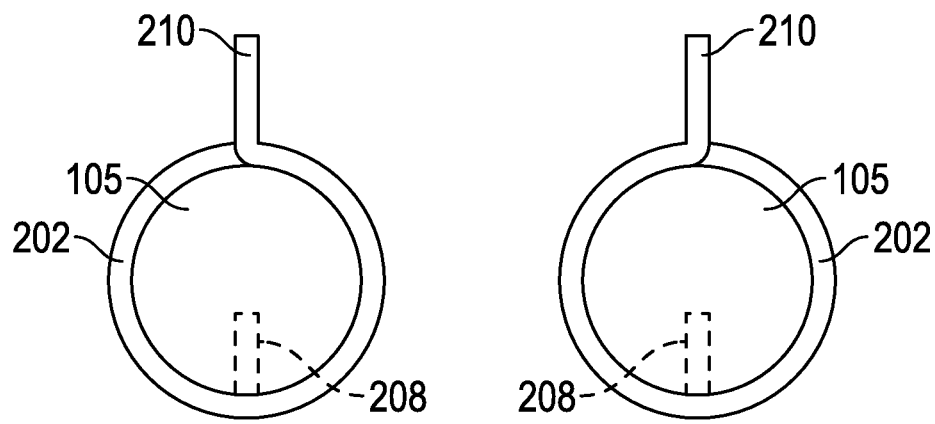
FIGS. 12A and 12B are top plan views of the ends of the two rolling seal shafts of FIG. 5 carrying the biasing springs, showing the rotation of the shafts through ninety degrees and the spring ends captured in the shafts as the seals are rolled from the closed to the open condition.

As best illustrated in FIGS. 9 and 10, the axle end portions 105 extend into counterbores 205 extending from the opposite end of seal seats 73. Counterbores 205 are accessible through the outer cylindrical end face of the manifold block during manufacture to allow for mounting of the torsional springs 202 on bore end portions 105, and may be capped for sealing purposes after assembly. As indicated in FIGS. 6, 10 and 12A, one end 208 of each spring is secured in a bore or seat extending radially inwardly into the extended end axle portion 105, while the opposite end 210 is bent radially outwardly and is secured in a bore or seat 212 extending inwardly from manifold counterbore 206 into fixed manifold block 65, as best illustrated in FIGS. 6, 9 and 11. Bores or spring seats 212 are not necessarily through holes, and in an embodiment extend around 0.5 inches into the manifold block. Through holes 212 may be sealed with epoxy material or the like after the springs are installed.

The recesses 30, 73 are of slightly smaller diameter than the respective elastomeric sleeves 102. The rolling seal is slid into the recess 30 or 73 via the open end at the end face 134 of the manifold body which receives part 36, so that the projecting end portion 105 or 106 of the shaft or axle extends into the counterbore at the opposite end of respective recess 30 or 73. Axle end portions 106 of the receptacle rolling seals 88 project out of the end face 134 at this point. The biasing springs 202 are then secured over the parts of end portions 105 in enlarged bore portions 206 of the receptacle manifold block, and the bores may be capped for sealing purposes. The segment-shaped part 136 is then inserted into cut-out region at the front end of the manifold block such that the axle receiving bores (not illustrated) engage over the projecting end portions 106 of the rolling seals, capturing the rolling seals 88. The part 136 may be secured to the remainder of the manifold block in any suitable manner.

In the case of the plug unit, which does not include actuator assisting devices or springs in this embodiment, the rolling seals are inserted into the recesses or seals 30 in the main manifold block in the opposite direction, with end portions 105 engaging on counterbores in the main manifold block and end portions 106 having actuator tabs projecting out from face 134 to engage receiving bores or seals in the segment shaped part 136. In an embodiment of the invention, the outer cylindrical surface of the manifold block 20 of the plug unit and the part-cylindrical outer surface of part 136 have matching screw threads. A threaded collet sleeve 145 is screwed over the front end of plug manifold 20 and part 136, securing the parts together. In the receptacle manifold block, the part 136 is held in position by outer shell 61 and by pins or screws 190 which extend transversely from the manifold block into part 136.

Installation of the rolling seals 88 in the recesses 73 of the receptacle manifold is the same as for the rolling seals 32 in the plug manifold, except for the fact that they are oriented in the opposite direction to the seals in the plug unit, and the fact that biasing springs or actuator assisting devices 202 are installed on the extended axle portions of the receptacle rolling seals 88, as described above. Operation of the rolling seal assembly as the plug unit and receptacle unit are connected together can be better understood with reference to FIGS. 13A-13G. When the units are separate or not connected, each rolling seal is in a closed position, as illustrated in FIGS. 1, 2, 6, and 13A. In this position, the through ports 114 extend parallel to the end faces of the units and the bores carrying the optical fibers and electrical leads are sealed.

In the unmated or seal closed condition of FIGS. 1 and 2, elastomeric portions of the rolling seals project outwardly through the aligned openings or slots 137, 138 in the end faces of the plug and receptacle manifolds, respectively. When the receptacle unit seals 88 are closed, the end of tabs 109 on axle portions 106 (FIGS. 8A and 8B) projecting into passageway 122 through slots 204 are positioned with tabs or teeth 109 engaging against a forward end of respective slots 204, as illustrated in FIG. 6 for one of the rolling seals 88. Similarly, as illustrated in FIG. 1, when the plug unit seals 32 are closed, the enlarged end portions 106 of each plug unit rolling seal are also located in an equivalent recessed region or chamber 140, but with the tabs or teeth 109 engaging the rear end wall 149 of the passageway between chamber 140 and passageway 124, which acts as a stop.

The pair of actuator rods 126 which actuate the plug rolling seals are identical, and each comprise an elongated rod which is of solid square cross section at its rear end and of generally L-shaped section along the remainder of its length. An end wall 152 at the forward end of each rod may be flush with the end face of the plug manifold block when the seals are closed, as illustrated in FIG. 1. A tab or flange 154 is spaced inwardly from the end wall 152, and is located on the opposite side of the rolling seal, as indicated in FIG. 1. The two rods 126 are slightly springy, and are mounted in the plug rear end wall 16 so that the tabs 154 face inwardly towards one another and the rods are flared slightly outwardly.

The single or center actuator rod 128 which actuates both receptacle rolling seals 88 extends from the rear end wall 16 through rectangular passageway or port 125 in the plug unit, and part of the rod 128 can be seen in FIG. 1. As best illustrated in FIG. 7, the forward end portion of center actuator rod 128 has a pair of separate tines 158 which each have an actuator notch 160 with actuating formations 160A and 160B at each end of notch 160 designed to engage and rotate the receptacle rolling seals from the closed to the open position and from the open to the closed position, respectively, as illustrated in FIGS. 13A to 13G and described in more detail below. The tines 158 are slightly resilient or "springy". The forward ends 170 of tines 158 are inclined inwardly towards one another so that rod 128 has a tapered tip.

As noted above, prior to connection of the plug and receptacle units in this embodiment, each of the rolling seals 32 and 88 projects partially outwardly from the respective slot opening 137,138 in the plug and receptacle manifold end face, as best illustrated in FIGS. 1 and 2. As the two units are brought together in the proper relative orientation, the central passageway 125 in the plug shell carrying the actuator rod 128 is aligned with port or passageway 122 in the receptacle manifold, while passageways 124 carrying actuator rods 126 are aligned with the ports or passageways 120.

Figure 13A:
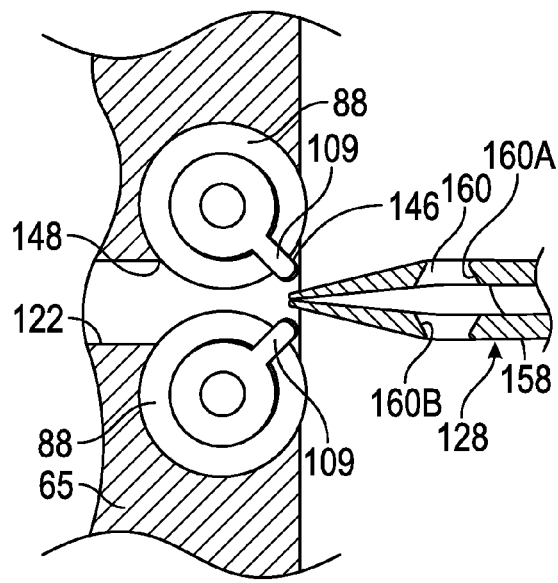

Actuator formations comprising tabs or flanges 154 on actuator rods 126 engage tabs or teeth 109 on each rolling seal 32 prior to connection of the plug and receptacle units, as illustrated in FIG. 1. The actuator rod 128 is aligned with port 122 in the receptacle manifold 65 as the plug and receptacle units are brought into engagement. Since the forward end of the center actuator rod 128 stands slightly proud of the forward end face of the plug manifold 20 prior to mating, it protrudes into aligned port 122 in the receptacle manifold when the two manifolds are face to face. FIG. 13A illustrates the position of rod 128 relative to the end face of the receptacle manifold when the two units are initially brought into face to face engagement.

Figure 13B:
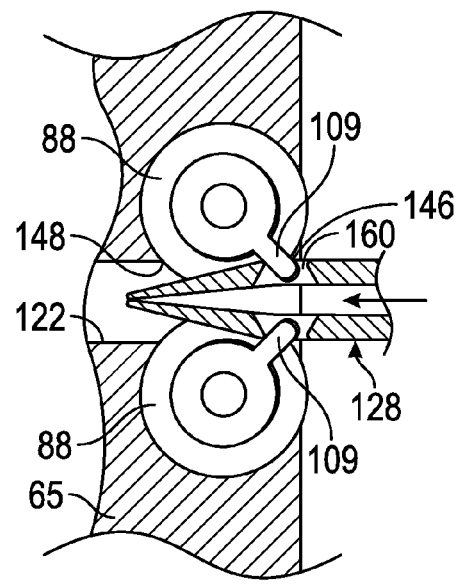

The connector units are pressed together in the first stage of mating operation, in which the projecting portions of the plug and receptacle rolling seals 32,88 are flattened, effectively expelling water from between their opposing faces and sealing the faces of the rolling seals of the plug to those of the receptacle. There may be debris trapped between the opposing seal faces at this point. As the connector units are pushed further together, with key 119 entering keyway 118, spring 24 of the plug unit begins to compress as the plug manifold is urged inwardly. At the same time, the rods 126 and 128 protrude outwardly through the ports 124 and 125 and move into the aligned ports 120 and 122. Thus, as the receptacle continues into the plug unit shell, the receptacle manifold block is impaled by the rods 126 and 128, as illustrated for rod 128 in FIGS. 13A-G. As rod 128 enters port 122 (see FIG. 13B), the actuating faces 160A of notches 160 contact the respective rolling seal tabs or teeth 109, which protrude partially into port 122 as illustrated in FIG. 6 and FIGS. 13A and B. FIG. 13B shows partial penetration of the actuator rod 128 into port 122. As the rod 128 continues inwardly in the direction of the arrow in FIG. 13B, the engagement of end faces 160A of notches 160 with tabs 109 rolls the two rolling seals about their longitudinal axes in opposite directions until they reach the end position as illustrated in FIG. 13C.

Figure 13C:
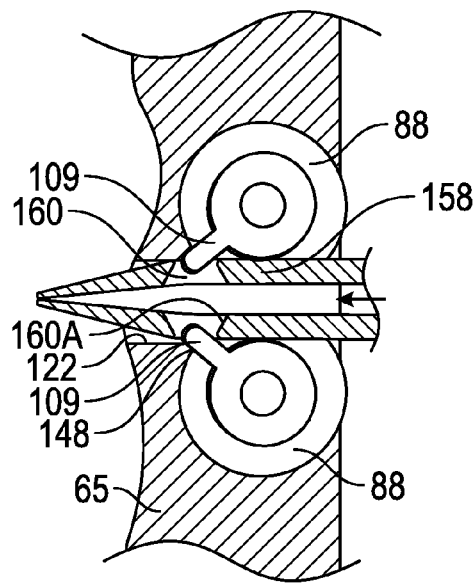

FIG. 13C illustrates the final position in which the tabs 109 of each axle end portion 107 have engaged the opposite ends of the passageways or connecting slots 204 (best seen in FIG. 6) preventing any further rotation. In this position, the rolling seals have rotated through 90 degrees so that through bores 114 are rotated into the open position and aligned with corresponding bores in the plug rolling seals, as also illustrated in FIG. 3. Thus, the tabs 109 permit the rolling seals 88 to rotate between a closed position in which the tabs 109 abut the forward end 146 of passageways or connecting slots 204, as in FIGS. 6 and 13A, and an open position in which the pins 109 abut the rear or inner end 148 of the connecting slots 204, as in FIG. 13C.

Figure 12B:
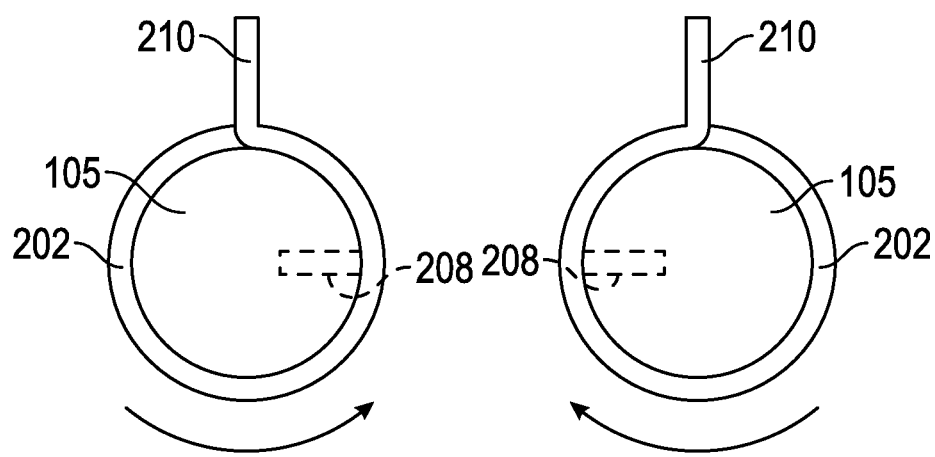

As illustrated in FIGS. 12A and 12B, as the receptacle rolling seals and shafts 105 rotate through ninety degrees between the close position of FIG. 12A and the open position of FIG. 12B, the lower ends 208 of the torsion springs secured to the shafts 105 are also rotated relative to the fixed upper ends 210, from the position shown in FIG. 12A to the end position shown in FIG. 12B. Thus, the springs are loaded in the open position, and act to bias the seals back towards the closed position. This assists the seal closing when the units are de-mated, as described in more detail below.

Figure 13D:
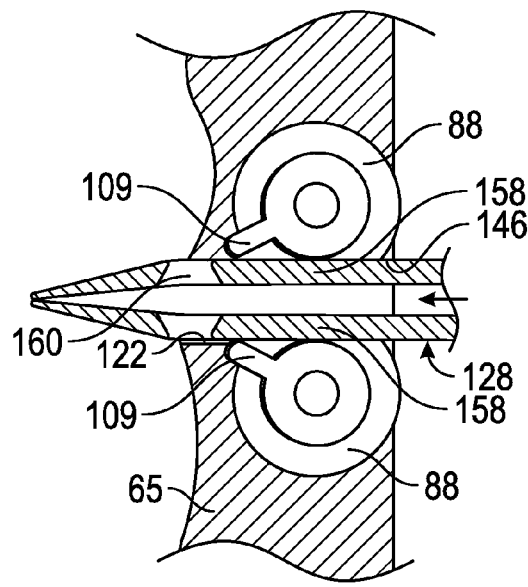

The actuator rod 128 travels further inwardly into port 122 after the rolling seals are fully open, as illustrated in FIG. 13D, as the plug manifold continues to be urged inwardly into the plug shell. The tines 158 are compressed inwardly to clear tabs 109, and once past the tabs 109, spring apart again. When the seals are open and rod 128 is in the innermost position of FIG. 13D, tabs 109 engage opposing surfaces of actuator rod 128, preventing the springs from urging the seals in the seal closing direction.

While the rod 128 is extending into the receptacle unit at the larger end portions of the rolling seals 88, rods 126 at the same time start to enter the ports 120, and in doing so travel progressively through chambers or regions 140 of the plug manifold as the manifold continues to be pushed inwardly further into shell 14. Rods 126 actuate the rolling seals 32 in the plug manifold to roll into the open position in much the same way as the rod 128 opens the rolling seals in the receptacle manifold, as described in more detail in U.S. Pat. No. 6,017,227 cited and incorporated by reference above.

The relationship between the actuator portions 154 and 160 of the rods 126 and 128 is such that the receptacle and plug rolling seals are actuated simultaneously and in opposite directions. As the units move from the position of FIGS. 1 and 2 to that of FIG. 3, in which the plug manifold has been pushed partially inwardly, the rolling seals have all been rolled through 90 degrees so that the bores are all open and connected from the receptacle unit into the plug unit. Any debris trapped between the mating end faces of the rolling seals tends to be rolled outwardly to one side of the seals as these faces rotate, and away from the region of the aligned bores.

As the mating sequence progresses beyond the point illustrated in FIG. 13C, the plug manifold is pushed further inwardly and the plug electrical and optical contacts pass through the aligned ports 114 of the rolling seals 32 and 88, and eventually making contact with the electrical sockets and the faces of optical ferrules in the receptacle, respectively, within the fluid bath 69 of the receptacle. The fully engaged connector is illustrated in FIG. 3. It can be seen that the spring 24 is compressed and the enlarged diameter portion of the receptacle shell has bottomed out on the end rim 18 of the plug shell. When passing through the rolling end seals, the tubular contact housings 40 of the plug expand the elastomeric bores 114 of the rolling seals, so that the bores grip and seal to the outer surfaces of the tubular contact housings. A double seal is provided in both the plug and receptacle, trapping a closed bath of fluid within the end seals. Double end seals are considered to be advantageous for electrical connectors as well as optical connectors.

As the connector units are mated together, the relative movement between the units leading to the engagement of the plug and receptacle contact elements or ferrules causes the volume within the oil chambers or baths of the plug and receptacle to change. These changes, in addition to changes which may occur due to variations in temperature and pressure, are compensated by flexing of the thin walled elastomeric baffles or bladders 57, 58 and 98, which thereby change their shape to accommodate such volume changes. These compensators vent to the outside environment via the vent ports 50 and 68.

A locking collet or sleeve 145 on the plug manifold has a releasable snap-lock engagement with the outer shell 61 of the receptacle unit in order to hold the end faces in sealing engagement when the rolling seals are in the open position, and prevent separation of the end faces until the seals are rolled back into a closed position. A plurality of spaced, resilient fingers 172 are provided by means of a series of inwardly directed slots 174 at the forward end of the collet. The collet has an inwardly projecting annular rib 175 adjacent the open forward end, which extends across the fingers 172. The outer shell 61 of the receptacle unit has a corresponding annular groove 176 (FIG. 2) spaced from the front end face of receptacle manifold 65 by a distance equal to the spacing of rib 175 from the front end face of plug manifold 20.

The outer shell 14 of the plug unit has a bore with a larger diameter outer end portion 178 and a smaller diameter portion 179 separated by an annular step or shoulder 180. Prior to connection of the plug and receptacle units, when the plug rolling seals are closed as in FIG. 1, the locking collet is positioned such that the rib 175 is positioned in the larger diameter portion 178 of the plug shell bore. As the receptacle and plug units are coupled together, the rib 175 snaps into groove 176 before the spring 24 starts to compress. As the receptacle manifold pushes the plug manifold back and the rolling seals start to move, the locking rib 175 is pushed back into the smaller diameter portion 179 of the bore, such that the plug manifold is locked together with the receptacle manifold and shell.

When the units are separated or de-mated, the plug and receptacle manifolds are coupled together by locking collet 145 until the locking rib 175 again reaches the larger diameter portion 178 of the plug shell bore, at which point the rolling seals are closed. Further separation forces the rib 175 out of groove 176.

As the units are de-mated, the movements of the plug contacts and seal actuator rods are reversed, with the actuator rods acting to rotate all the rolling seals back in the opposite direction until they are in the fully closed position of FIGS. 1 and 2 again. This arrangement helps in preventing or substantially preventing any seawater from entering the sealed oil chambers of the plug or receptacle as these units are mated and de-mated.

The operation of the actuator rod 128 as the plug and receptacle manifolds move outwardly relative to the plug shell bore as the units are de-mated is illustrated in FIGS. 13E to 13G. As the receptacle unit is moved out of the plug shell bore, the plug manifold is urged outwardly under the action of spring 24. Actuator rods 126, 128 begin to move out of the receptacle manifold ports 20 and 22, as indicated by the arrow in FIG. 13E, and back into the plug manifold ports 124, 125. As indicated in FIG. 13G, as the rod 128 moves in the direction of the arrow out of port 122, the actuator faces 160B of notches 160 on the ends of the tines 158 contact the rolling seal tabs 109. The rod 128 continues to move out of the port, pushing the tabs 109 to the right, until they contact the forward end wall 148 at the junction between chamber 140 and port 122, as indicated in FIG. 13F. This prevents the tabs from moving any further. During this movement, the rolling seals 88 are rolled back from their open position as in FIG. 3 to the closed position as in FIG. 2. The tines are then pushed together so that projections 160 can pass over the tabs 109 and the rod 128 can move completely out of port 122 and back into the aligned port 125 in the plug manifold, as indicated in FIG. 13G. Simultaneously with the operation of rod 128 to close seals 88, the rods 126 rotate seals 32 into the closed position in a similar manner. At this point, the collet sleeve has released the receptacle shell and the plug and receptacle manifolds can be separated.

In prior rolling seal connectors, if the center actuator rod is deformed for any reason, there is a risk of the receptacle seals not fully closing when the connector units are de-mated. The use of an actuator assisting or biasing device in association with each rolling seal 88 in the receptacle unit, such as torsional springs 202 as described above and illustrated in FIGS. 6 to 12B, assists in closing or substantially closing the seals each time the connector is de-mated, regardless of any deformation of the center actuator. If the center actuator does not urge the seals into a fully closed position before exiting the port 122 as seen in FIG. 13G, the biasing action of torsion springs 202 biases the seals towards the closed position as soon as the actuator rod starts to move out of port 122 in the position shown in FIG. 13F. This offers a measure of redundancy in the connector in the case of actuator failure.

In an embodiment, the diameter of manifold bore portion 206 which receives the axle end portion and torsion spring 202 was around 0.25 to 0.35 inches, and each spring 202 had maximum outer diameter equal to the bore portion diameter, and an inner diameter in the range from 0.10 to 0.20 inches. In an embodiment, the diameter of each manifold bore portion 206 was 0.29 inches, the maximum outer diameter of each spring 202 was 0.29 inches, and the minimum inner diameter of each spring 202 was 0.16 inches. The spring height was around 0.15 to 0.20 inches, and in one example was 0.18 inches, with the spring ends turned outward or upward to engage in the receiving bore or seat in the manifold block. If desired, the spring outer diameter and height may be increased to provide a larger spring and increased biasing force. In an embodiment, the seal axles were of PEEK (polyether ketone) or similar rigid plastic material, while the manifold block was of an engineering thermoplastic material such as Delrin®. Other materials such as metal may be used in alternative embodiments.

The torsion springs used to assist rolling seal closure in the above embodiment are relatively easy to manufacture. The rolling seal axles only have to be modified slightly to increase their length at one end by an amount equal to or slightly greater than the spring height to provided an extended portion on which the spring may be mounted. The design ensures that the rolling seal axles remain in contact with the axle holding geometry, for example in bore portion 205. Due to the opposite direction of rotation of the two rolling seals, with the right hand seal rotating clockwise as viewed in FIG. 6 and the left hand spring rotating anti-clockwise, the springs 202 are not identical but instead are coiled in opposite directions between the inner or first end secured to the axle shaft and the outer or second end secured to the receptacle manifold block (see FIG. 6). The axle of the left and right hand seals are also not identical, since the opening or bore for receiving the inner end 208 of each seal is located differently on the left and right hand seal.

FIGS. 14 to 25 illustrate a second embodiment of a rolling seal connector 380 with rolling seals in the plug and receptacle units 310, 312 actuated by actuator rods to move back and forth between closed and open positions along with actuator assisting devices to bias the rolling seals in at least the receptacle unit 312 towards the closed and sealed position.

Figure 20A:
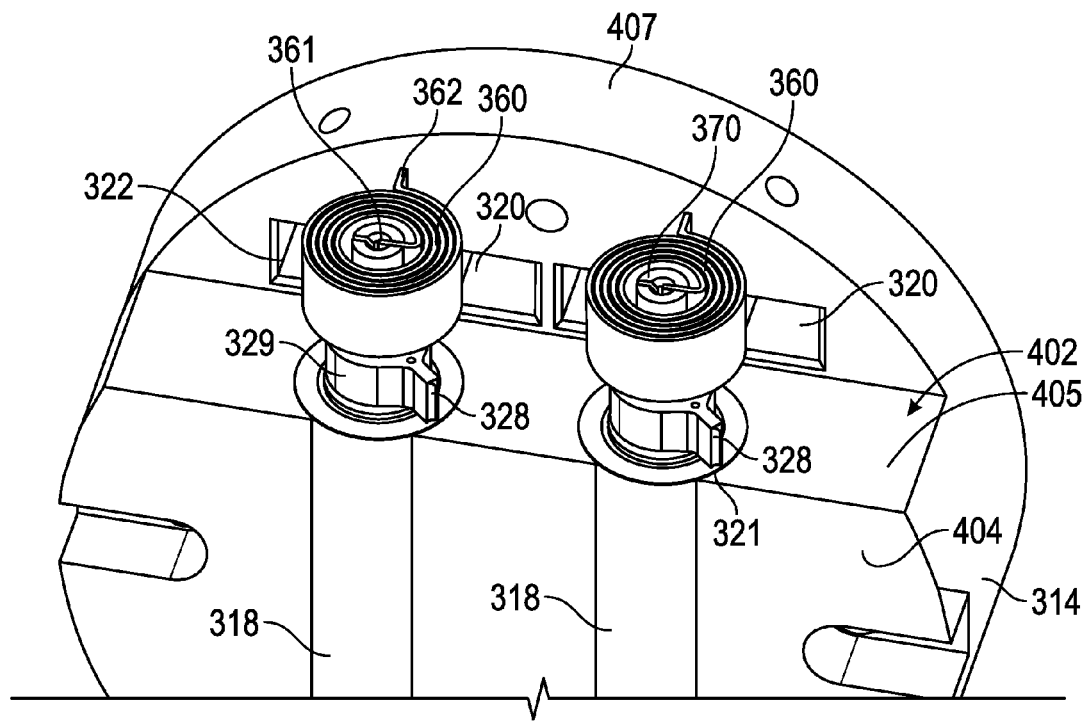
FIG. 20A is a perspective view of the receptacle front end manifold, partially cut away, with part of the manifold block omitted to reveal an embodiment of a modified actuator assisting device mounted on extended portions of each of the rolling seal axle shafts, illustrating the rolling seals in the closed and sealed position prior to mating of the plug and receptacle units.
Figure 20B:
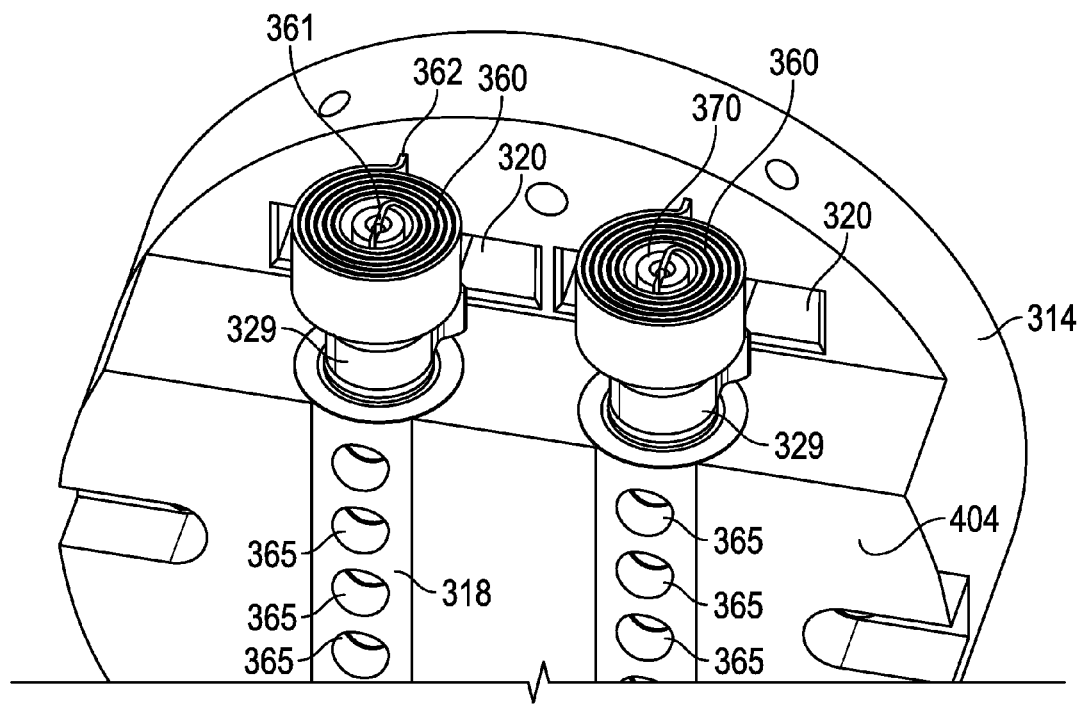
FIG. 20B is a perspective view similar to FIG. 20A, but illustrating the rolling seals in the open position after mating of the plug and receptacle units.

This embodiment differs from the previous embodiment in several respects. First, each actuator assisting device is a clock spring 360, as best illustrated in FIGS. 20A and 20B, i.e. a spring comprising a flat strip wound in a spiral shape, rather than a torsion spring. Second, the rolling seals in the receptacle unit rotate in the same direction between closed and open positions, rather than opposite directions as in the previous embodiment, as do the rolling seals in the plug unit, and the actuator rods and the passageways for receiving the rods are modified as discussed in more detail below. Third, the actuator assisting devices are mounted on axle portions at the opposite end of the seals from the first embodiment. It should be understood that either a torsion spring or a clock spring may be used in either of the two embodiments, and may be mounted on an axle extension at either end of the rolling seal.

The connector in this embodiment is a twelve-way connector and is an optical connector designed for making fiber-optic connections. As in the previous embodiment, the connector of FIGS. 14 to 25 may be modified for making only electrical connections or both electrical and fiber optic connections. Additionally, the connector may alternatively be designed for making a greater or lesser number of connections, depending on the application. The connector may be used for making connections in any harsh environment, not only underwater or at great ocean depths, although it is particularly intended for use in underwater applications. Apart from these differences, connector 380 is similar to that of FIGS. 1 to 13, and similar parts of the connector such as contacts and pressure compensating contact chambers are therefore not described or illustrated in detail.

The connector in this embodiment is shown with an ROV (remotely operated vehicle) connecting structure 316 for a flying lead handle on an outer connector housing 390 of the receptacle unit 312 for engagement by an ROV manipulating arm when mating or de-mating the connector units underwater, while the plug unit has an annular connecting flange (not illustrated) for connection to a bulkhead or the like. Such devices are well known in the field and are therefore not described in detail.

Figure 14:
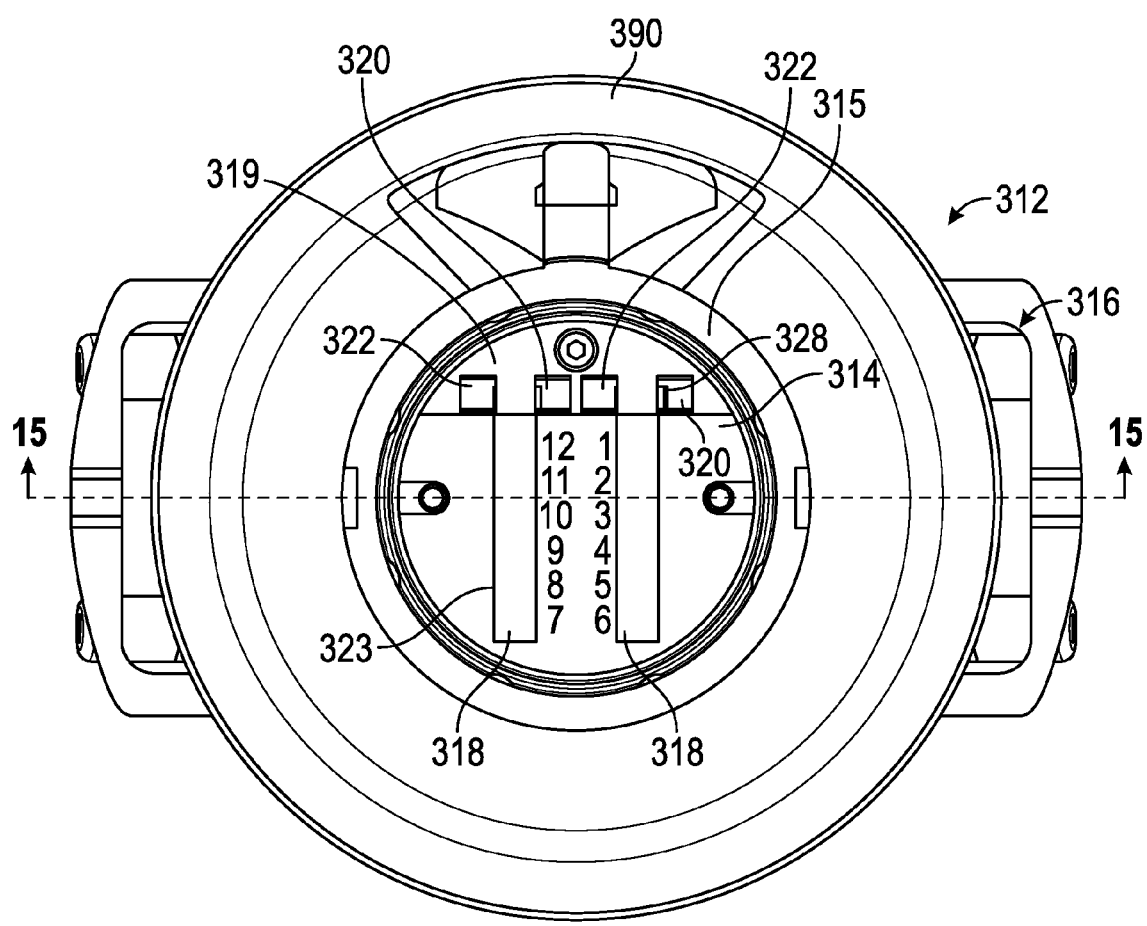
FIG. 14 is a front elevation view of a receptacle unit of a rolling seal connector according to another embodiment.
Figure 15:
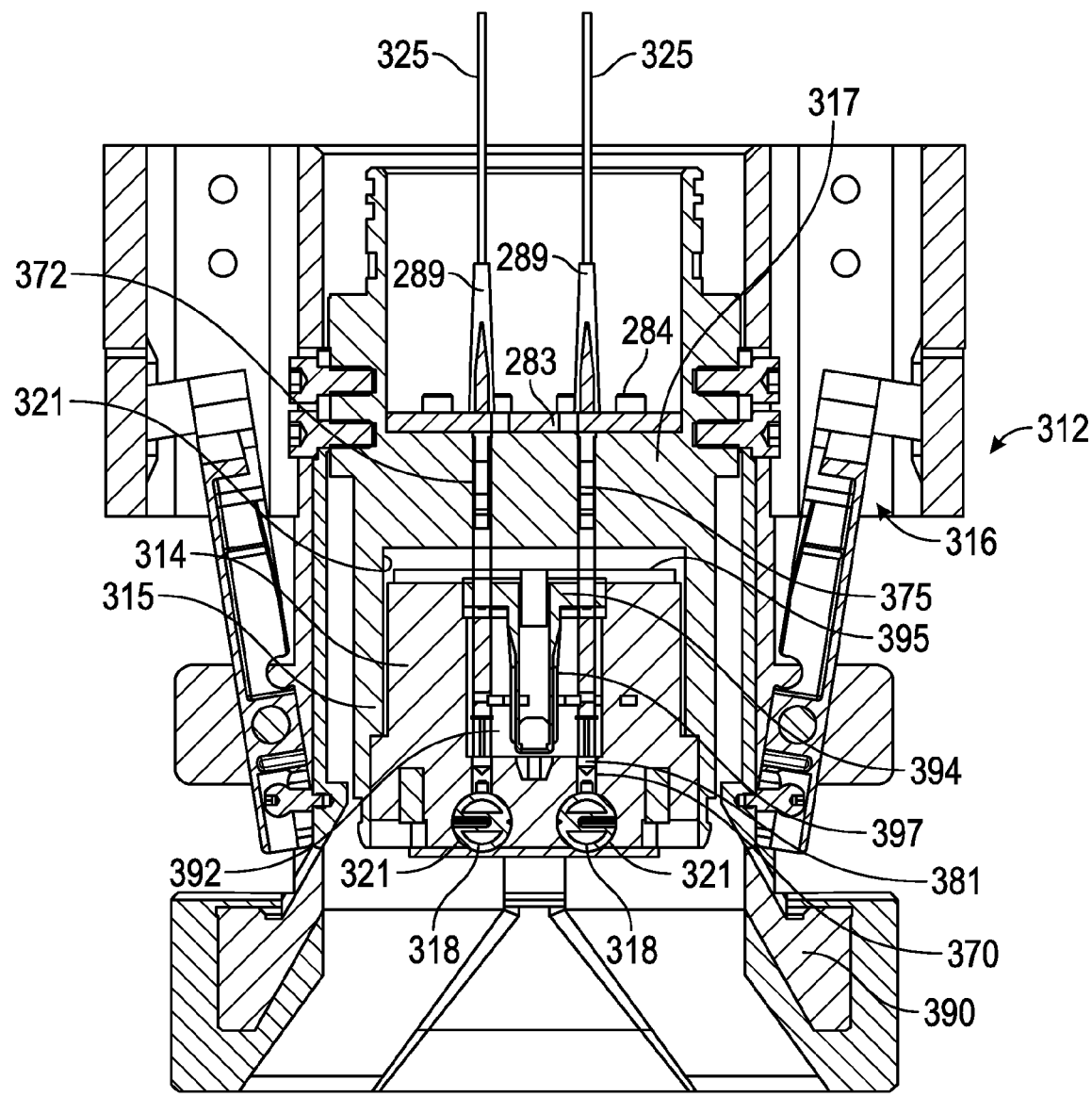
FIG. 15 is a cross-sectional view on the lines 15-15 of FIG. 14.
Figure 16:
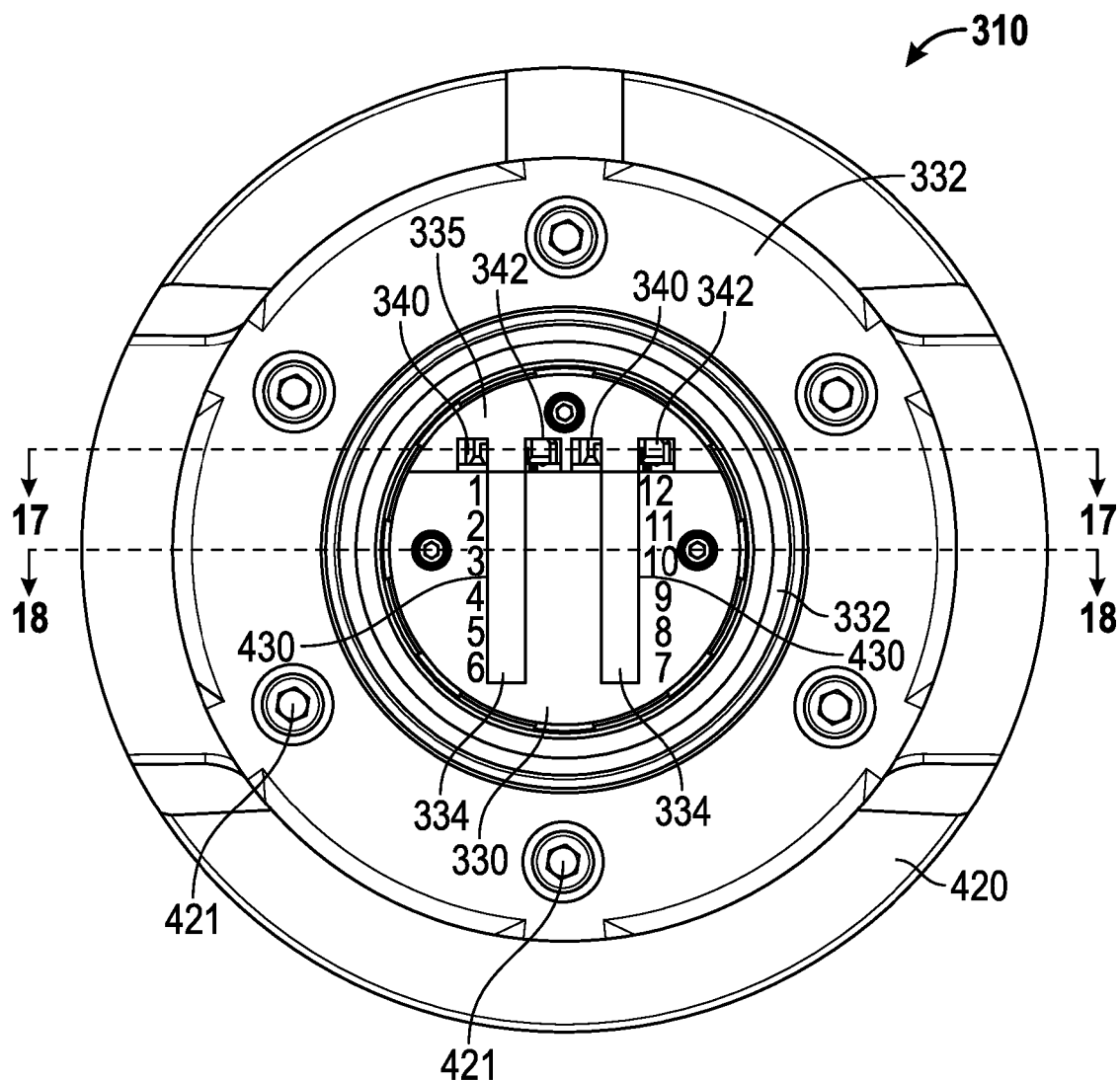
FIG. 16 is a front elevational view of a fixed bulkhead or plug unit for releasable mating engagement with the receptacle unit of FIG. 14.

Other details of the plug and receptacle units are omitted in FIGS. 14 to 18 for clarity in explaining the modified rolling seal operation, and the omitted details are similar or identical to the first embodiment described earlier. As illustrated in FIGS. 14 and 15, receptacle unit 312 has a rigid outer shell 315 secured inside outer connector housing 390. Receptacle shell 315 has a terminal or rear end wall 317 and a cylindrical bore 321 projecting inwardly from the forward end. A receptacle manifold block or forward end portion 314 of rigid material is secured in the axle mount 319 in shell 315 via suitable retaining screws (not illustrated), leaving a chamber between the rear end of block 314 and the end wall 317 with a portion outside the bladder which communicates with the exterior of the unit via vent ports (not illustrated). A series of through bores or passageways 370 extend through the manifold block 314, terminating in a pair of part-cylindrical seats or recesses 321 with slot-like openings 323 at the forward end of block 314. Rolling seal devices 318 are rotatably mounted in each of the seats 321 to seal the open forward ends of bores 370 in the closed position illustrated in FIGS. 14 and 15. The number of through bores corresponds to the number of connections to be made, as discussed above, and in this case six parallel bores are provided in each half of the manifold, one each of which is seen in FIG. 15, and the bores are aligned with corresponding bores in rolling seals 318 in the open and mated condition of unit 312, as described in more detail below. Aligned through bores 372 are provided in rear end wall 317, and electrical and optical tubular housings 375 project through bores 372 and into aligned bores 370, as illustrated in FIG. 15.

Optical fibers 325 pass through the bores of tubular housings 375 and terminate to alignment ferrules 381 which are secured in seats at the end of the respective tubular housings 375. Connections of the fiber to the alignment ferrules are made using standard epoxy and polish techniques. Suitable seals (not illustrated) similar to those of the previous embodiment are provided between each housing 375 and the rear end wall bore 372 to seal the end wall, and between each housing 375 and the bore 370 through manifold block 314.

A backing plate 283 is secured over the rear end wall and housings 375 via mounting screws 284, and the assembly forms an impermeable high pressure barrier at the terminal end of receptacle unit. Rubber strain relief members or boots 289 are sealed over projecting end portions ends of the optical leads outside backing plate 283.

The manifold block 314 has a central, internal chamber 392. A flexible compensator seal 394 is located across the rear end wall of the chamber 392 and secured with a backing plate 395 secured across the inner end of block 314 via suitable fasteners (not illustrated). Seal 394 acts as a Morrison seal around each of the tubular housings 375. Flexible bladders 397 project from seal 394 into chamber 392 and communicate with the external environment in a similar manner to that described above in connection with the first embodiment. The portions of chamber 392 outside bladders 397 form a contact chamber filled with a dielectric optically clear fluid.

As best illustrated in FIGS. 20A to 22B, receptacle manifold block 314 is generally cylindrical in shape with an enlarged front end portion 400 which has a cut-away segment 402 (see FIG. 20A) extending inwardly from outer end face 404. As in the previous embodiment, cut-away segment 402 has an end face 405 extending across first ends of each of the part-cylindrical seats 321 which receive the respective rolling seals 318, and a matching, segment shaped block portion 319 engages in cut-away segment 402. Four rectangular or square actuator receiving bores or passageways extend through block portion 319 and the mating receiving portion 407 of manifold block 314 in a line adjacent the first ends of the rolling seals 318, as best illustrated in FIGS. 14, 20A, 20B and 21. Two bores 320 are designed to receive actuator rods for actuating the receptacle rolling seals 318, and the other two bores 322 are designed to receive actuator rods which actuate the plug rolling seals, as described in more detail below in connection with FIGS. 16 to 19 and 24A to 24D. The bores 320, 322 are of rectangular or square cross-section slightly larger than the cross-sectional dimension of the actuator rods which extend into the bores during mating.

The plug unit 310 is illustrated in FIGS. 16 to 19 and has an outer connector housing or body 420. A cylindrical shell 332 having a sealed rear end wall 344 is secured in a rear end of outer body 420 via bolts or fasteners 421, and an open forward end 424. A plug contact manifold or front end portion 330 of rigid material is slidably mounted in plug chamber 435 and is biased by biasing spring 338 into the forward position illustrated in FIGS. 17 and 18.

Figure 18:
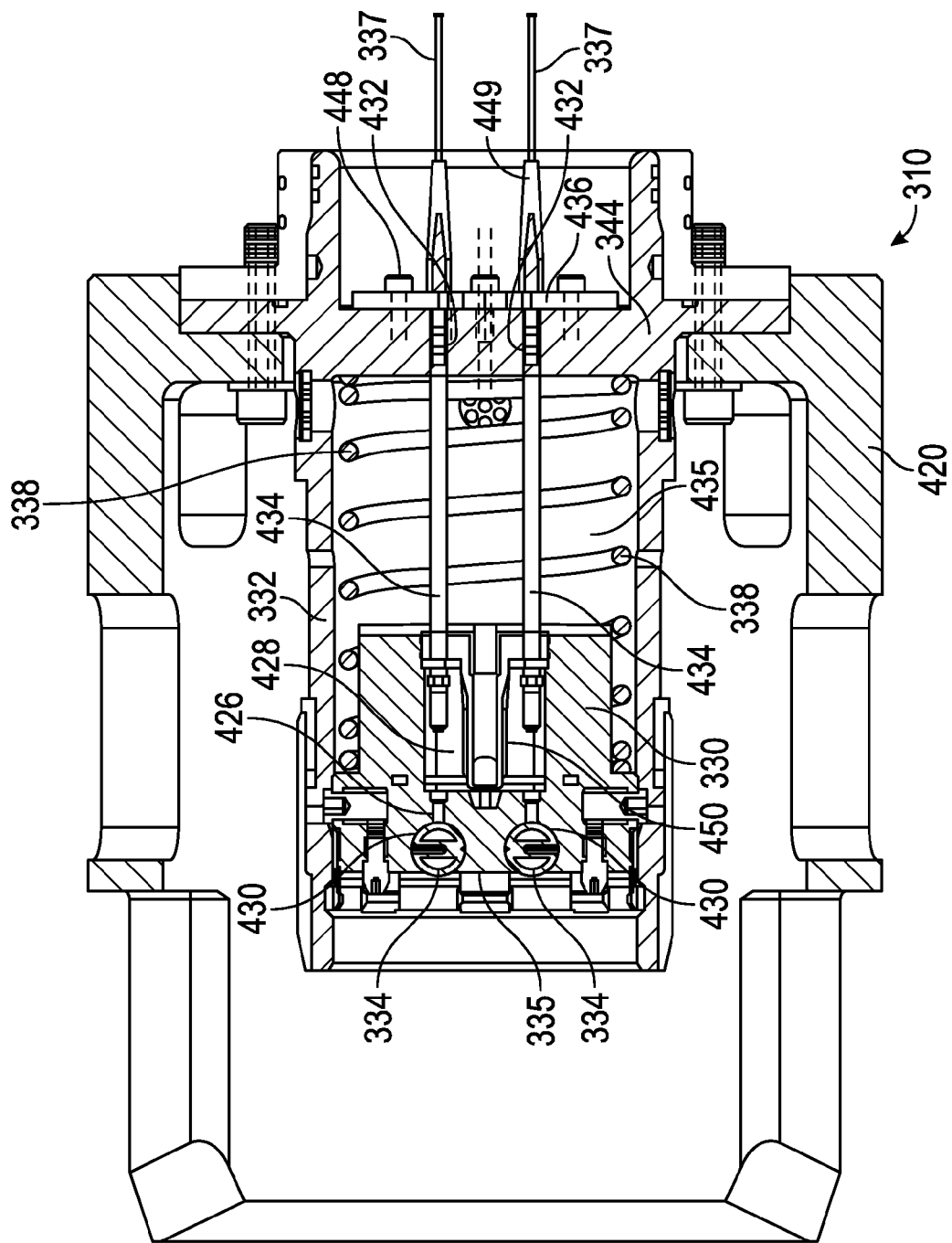
FIG. 18 is a cross-sectional view on the lines 18-18 of FIG. 16.

The plug manifold has a pressure compensated internal chamber 428 and a series of parallel through bores 426 extending from chamber 428 to the forward end of the manifold, two of which are illustrated in FIG. 18. The number of bores depends on the number of connections to be made, which in this case is twelve, although a greater or lesser number may be provided, depending on the number of connections to be made. Six of the bores are located in one half of the manifold block 330, and the other six are located in the other half of the manifold block, and the bores terminate in a pair of parallel, part-cylindrical recesses or rolling seal seats 430 located in the front face of the manifold (see FIGS. 16 and 18), with six bores terminating in one recess and the other six bores terminating in the other recess. A pair of rolling seals 334 are rotatably mounted in the respective recesses 430. Although the ends of the bores 426 are hidden by the rolling seals 334 in FIG. 16, it will be understood that they are generally aligned with numbers 1 to 6 adjacent the left hand recess and the numbers 7 to 12 adjacent the right hand recess.

A series of through bores 432 in the shell end wall 344 are each aligned with a respective one of the manifold through bores 430. A series of optical fiber housings 434 defining contact chambers project through respective aligned bores 432 and through chamber 435 inside plug shell 332 into the manifold block 330. Optical fibers 337 pass through the bores of optical fiber housings 434 and terminate to alignment ferrules which are secured in seats at the end of the respective tubular housing 434. As in the previous embodiment, each of the housings 434 is sealed via O-ring seals to the respective bore 432 in the end wall 344. A backing plate 436 is secured over the rear end wall and housings 434 via mounting screws 448, and the assembly forms an impermeable high pressure barrier at the terminal end of the plug unit. A rubber strain relief member or boot 449 is secured over the projecting end of each housing 434 and the optical lead on the outside of plate 436.

Dielectric fluid fills the forward end of each of the bores 426. Member 450 inside chamber 428 is a flexible bellows or diaphragm which provides pressure compensation between the pressure of fluid inside and outside the chamber 428 by flexing inwardly or outwardly as appropriate.

Figure 17:
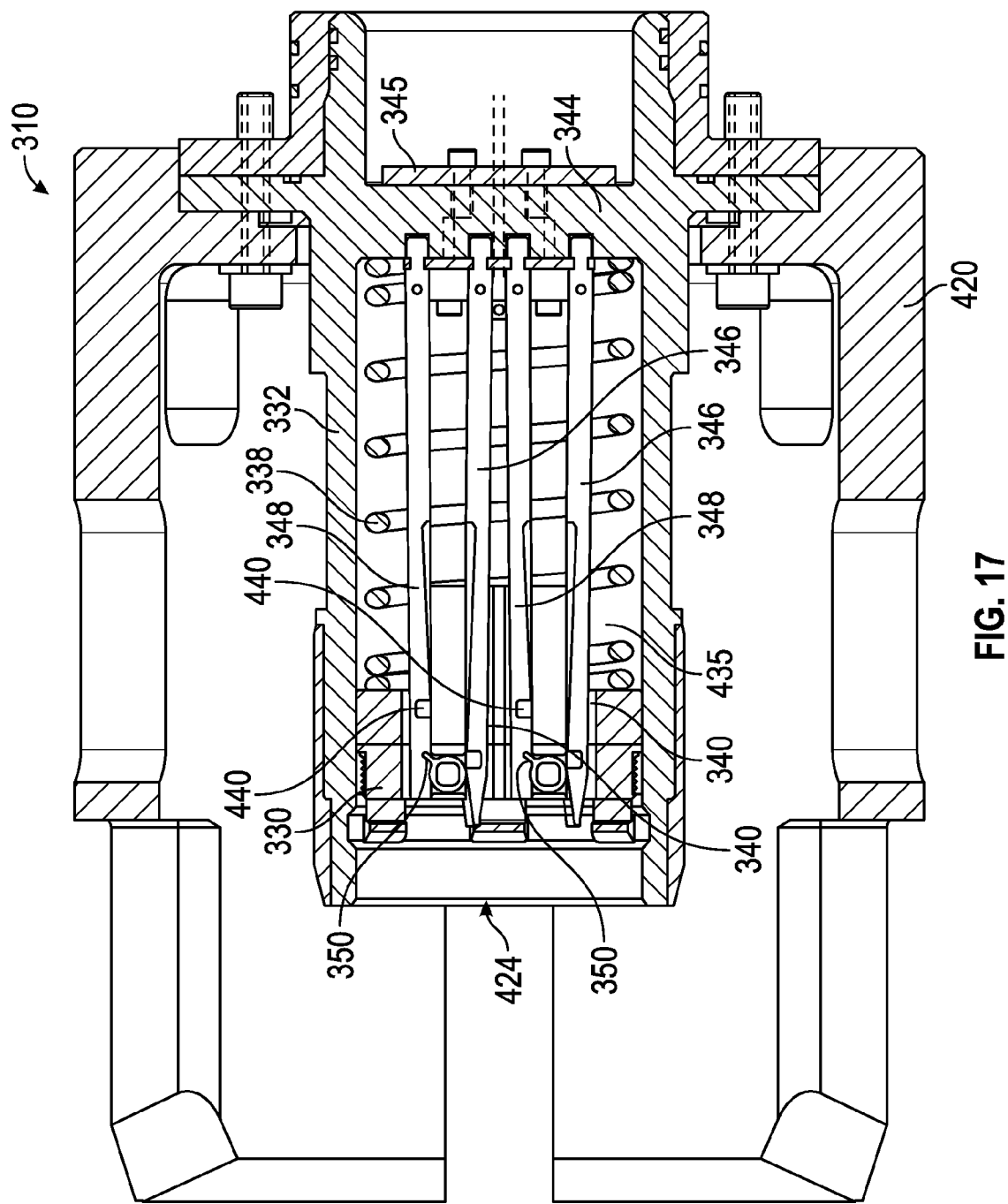
FIG. 17 is a cross-sectional view on the lines 17-17 of FIG. 16.
Figure 19:
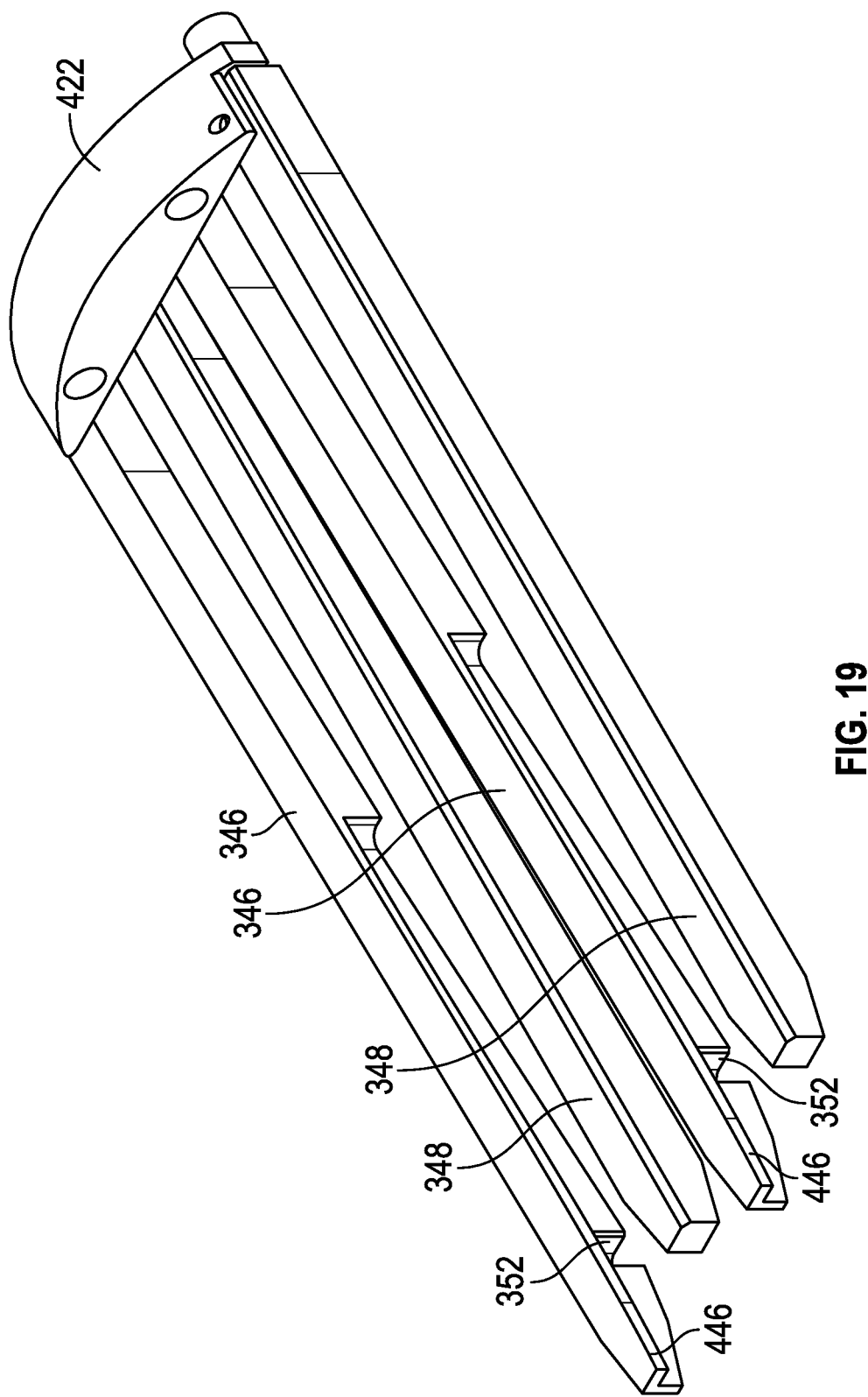
FIG. 19 is a perspective view illustrating the four actuator rods of the plug unit extending from the rear end plate or base support of the plug unit, with all other parts of the plug unit omitted for clarity.

As best illustrated in FIG. 17, two pairs of actuator rods 346, 348 extend forwardly through chamber 435 and into aligned pairs of ports or passageways 340, 342, respectively, in plug manifold block 330. Passageways 340, 342 extend through manifold block 330 and open in the outer face 335 of the manifold block. As illustrated in FIG. 19, the rods are arranged in a line and extend forwardly from actuator mount 422 with the pairs of rods interleaved, in other words, actuator rods 346 alternate with rods 348 across the plug unit chamber. The passageways are of matching rectangular or square cross-section to the rods 346, 348 and slightly larger dimensions than the rods, to allow the rods to slide through and out of the passageways during mating. In the unmated condition of FIGS. 16 to 18, the actuator rods may have forward ends which stand proud from the front end face 335 of manifold block 330. During mating, ports 340 are aligned with corresponding actuator receiving ports 320 in the receptacle manifold block 314, while the pair of ports 342 are aligned with corresponding ports 322 in the receptacle manifold block.

The rolling seals 318 of the receptacle unit are similar in some respects to the rolling seals 88 of the first embodiment, and like those seals, each receptacle rolling seal comprises a rigid core 366 over which an elastomeric roller or sleeve 368 is molded or otherwise affixed. The core is of metal or hard plastic and has integral reduced diameter axle ends or axle portions 367, 370 projecting from opposite ends of core 366 (see FIGS. 22A and 22B). One axle portion 367 is shorter than the opposite axle portion and is rotatably engaged in a matching seat or bore 371 adjacent a second end of the respective rolling seal seat 321.

A larger diameter axle portion 329 in the main body of the receptacle manifold extends from the opposite end of core 366, and projects out from cut out end face 405 as seen in FIGS. 20A and 20B. Radial tab or tooth 328 projects from axle portion 329 and into a respective actuator bore 320, as seen in FIGS. 20A, 20B, 22A and 22B. A smaller diameter end portion 370 projects from axle portion 329. The seal core 366 and surrounding sleeve have through holes 365 passing transversely through the rolling seal. Actuator assisting devices or clock springs 360 are mounted on reduced diameter projecting axle or end portions 370 as best illustrated in FIGS. 20A, 20B, 22A and 22B. This arrangement is different from the previous embodiment, where the actuator assisting devices were mounted on the opposite end of the rolling seal axles to the actuator engaging tabs.

In this embodiment, the actuator assisting devices comprise clock springs 360, but other types of spring or other biasing devices may be used in other embodiments. The plug rolling seals 334 are identical to the receptacle seals apart from the extended axle end portions 329 of seals 318 on which clock seals 360 are mounted, which are not present on the plug rolling seals since no actuator assisting devices are provided in the plug unit in this embodiment. As in the case of the receptacle rolling seals, the enlarged end portions of the plug rolling seals have projecting actuator tabs 350 which extend into passageways 342 for engagement by actuator rods 348 during mating and de-mating. If needed in alternative embodiments, the plug seals 334 may be modified to allow for mounting of actuator biasing devices on the plug seal axles or shafts as well as on the receptacle seal axles or shafts.

The main body of each of the receptacle rolling seals 318 is rotatably engaged in the matching seat 321 which opens into the front face 404 of receptacle manifold block 314, while the axle end portions at opposite ends of the main body are rotatably mounted in corresponding counterbores in the receptacle manifold at opposite ends of each recess or seat 321.

Figure 22A:
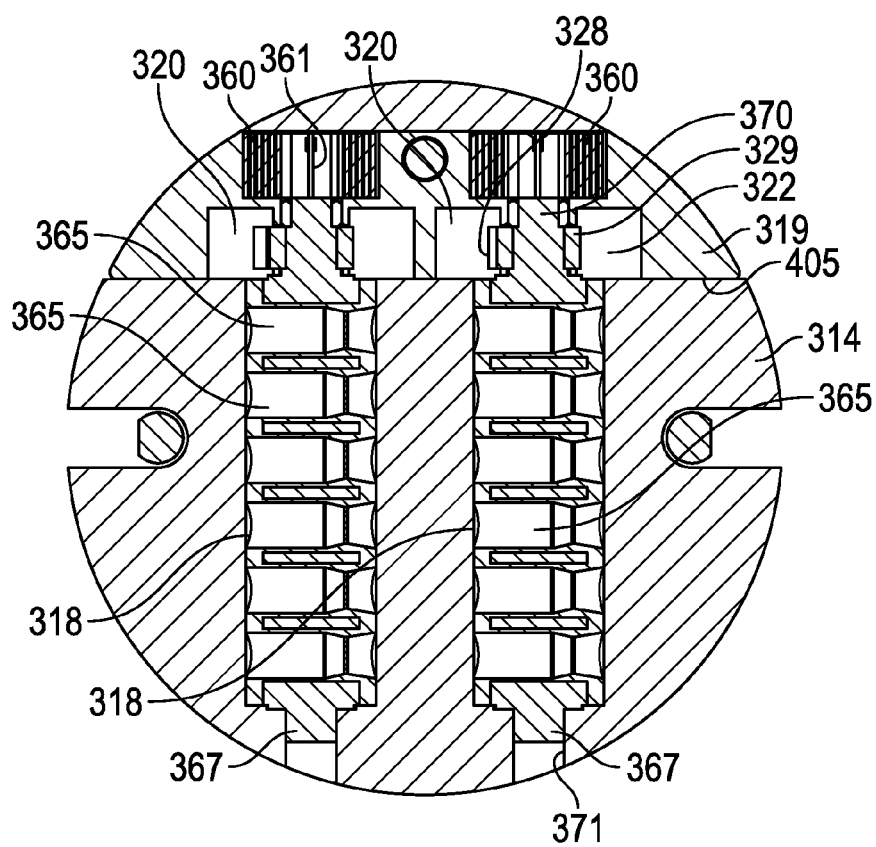
FIG. 22A is a cross sectional view through the manifold block and rolling seals of FIG. 21 in a plane parallel to the front face of the manifold block, illustrating the seals in the closed position.

As illustrated in FIGS. 20A and 20B, unlike torsion springs which are spirally and helically wound wires, the clock springs 360 are formed by winding a strip of metal or other material into a helix so that opposite inner and outer end portions 361, 362 are not offset axially from one another. This arrangement requires a larger diameter envelope or mounting bore than the previous, spirally wound spring, but a shorter axial length. Unlike the previous embodiment, where the actuator assisting spring is mounted in the main manifold block on the opposite end of the axle to the actuator tab, the clock springs 360 in this embodiment are mounted in counterbores 374 in the smaller, segment shaped block part 319 which also includes the actuator rod receiving passageways and the enlarged axle portions 329 carrying actuator tabs 328, as best illustrated in FIGS. 22A to 23. The inner end portion 361 of each spring is mounted in a radial slot provided for that purpose in the respective axle end portion 370 (see FIGS. 20A and 20B), while the outer end portions 362 of springs 360 extend into respective slots or spring seats 375 in the inner end wall of manifold block part 319 which communicate with counterbores 374 as seen in FIG. 23. The exposed outer ends of the counterbores 374 may be suitably capped and sealed after the block portion 319 is mounted in indent 402 over the exposed ends of the seal axles and springs.

Figure 21:
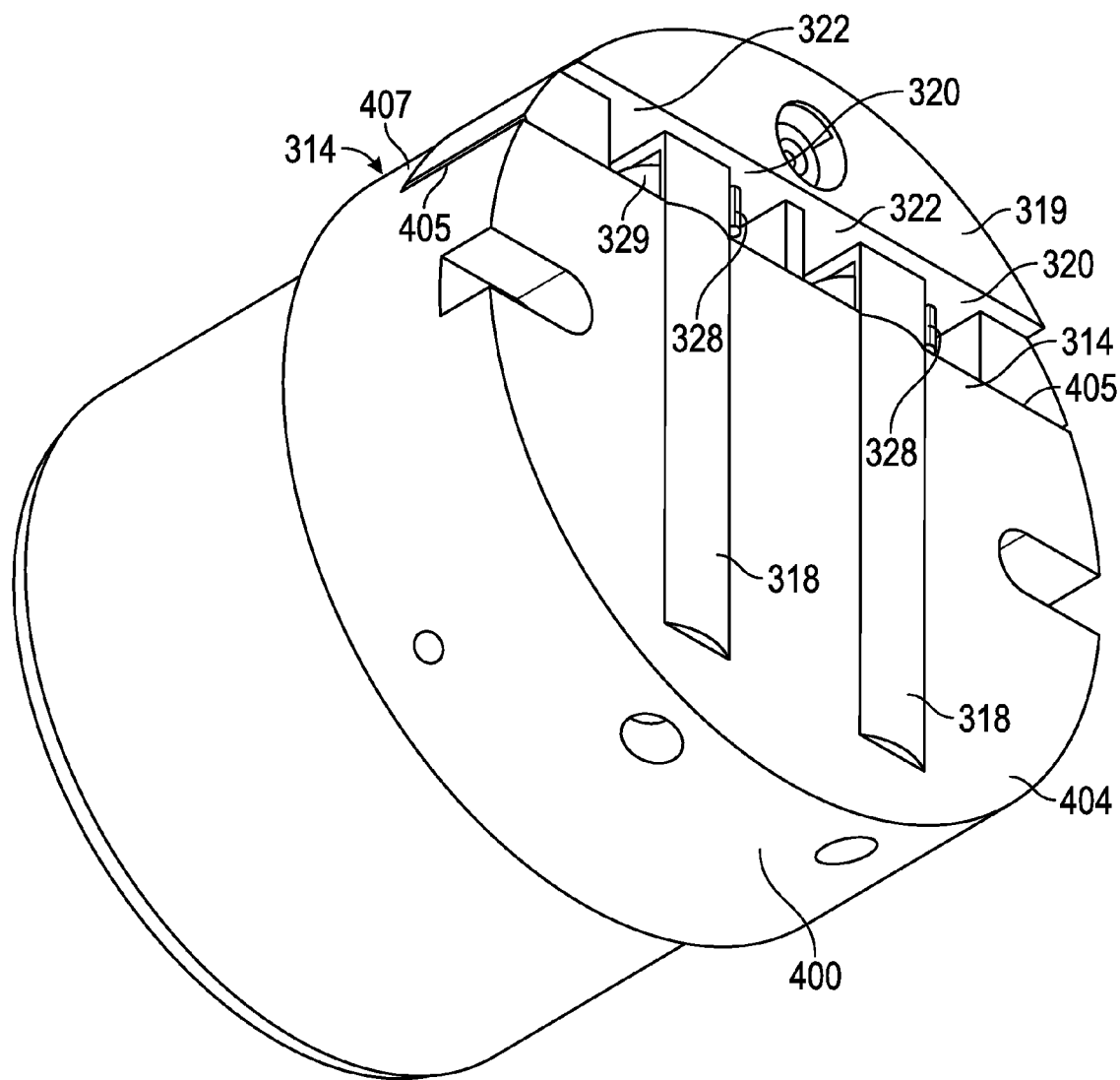
FIG. 21 is a perspective view of the receptacle front end manifold block with the rolling seals in the closed position.

FIGS. 20A, 21 and 22A illustrate the rolling seals 318 in the closed and sealed position. As seen in these drawings, in this position both actuator tabs 328 are oriented towards the front of the receptacle manifold block and face in the same direction into separate actuator rod receiving passageways 320 (unlike the previous embodiments where actuator tabs 109 are oriented inwardly in opposite directions, into the same central actuator bore, as shown in FIGS. 6 and 13A). Similarly, the actuator tabs 350 of the plug rolling seals 334 are oriented towards the rear of the plug manifold block in the sealed position of FIG. 17, and face in the same direction into separate actuator passageways 342, rather than in opposite directions as in the previous embodiment.

In the closed and sealed position, the ends of the clock springs 360 may be positioned so that the springs are relaxed or pre-loaded. As seen in FIG. 20A, in this position spring end portion 361 is oriented at 90 degrees to outer spring end portion 362. FIG. 20B illustrates the rolling seals 318 rotated into the open position. The inner end portion 361 is rotated with the seal axle 370 through ninety degrees relative to the outer end of the spring, from the closed position of FIG. 20A to the open position of FIG. 20B. This produces an additional half turn in the spring, so that the spring is deformed and loaded. The loaded springs 360 in FIG. 20B bias the rolling seals back towards the closed condition. In this embodiment, seals 318 roll in the same direction and both springs are in exactly the same orientation in the open position. Thus, the springs 360 are identical, as are the axle end portions 370 in which they are mounted. This embodiment therefore does not require different left and right springs or different left and right axle end portions for the two seals, simplifying manufacture and assembly.

The actuator rods 346 and 348 which operate the receptacle and plug rolling seals, respectively, are different from the actuator rods of the previous embodiment and the prior rolling seal connector of U.S. Pat. No. 6,017,227 referenced above. In particular, the prior center actuator rod which operated both receptacle rolling seals rolling in opposite directions in the previous embodiment is replaced by two separate actuator rods 346 which operate both rolling seals 318 to rotate in the same direction. This reduces the risk of actuator rod deformation. Additionally, the plug seal actuator rods 348 are modified to rotate both seals in the same direction (opposite to the rotation direction of the receptacle seals), and have actuator formations or actuating notches 440 which can be seen in FIG. 17, and which each face in the same direction (the opposite direction from rods 346), rather than in opposite directions as in prior U.S. Pat. No. 6,017,227 referenced above. This also makes manufacture and assembly simpler than in prior rolling seal connectors.

Figure 22B:
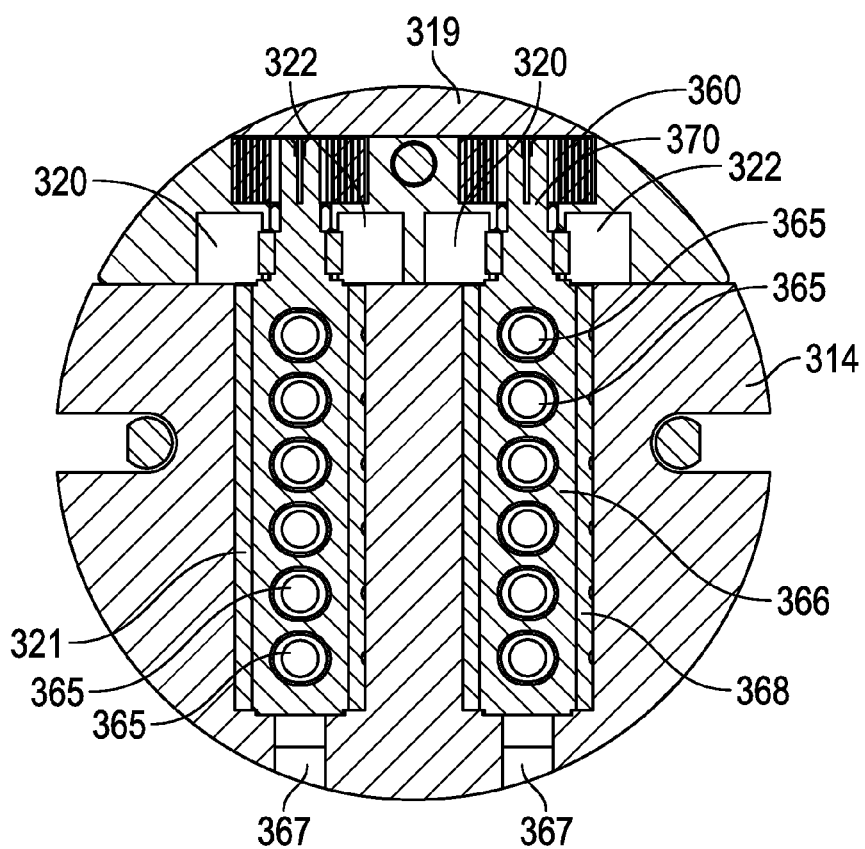
FIG. 22B is a cross sectional view similar to FIG. 22A, illustrating the rolling seals in the open position.
Figure 23:
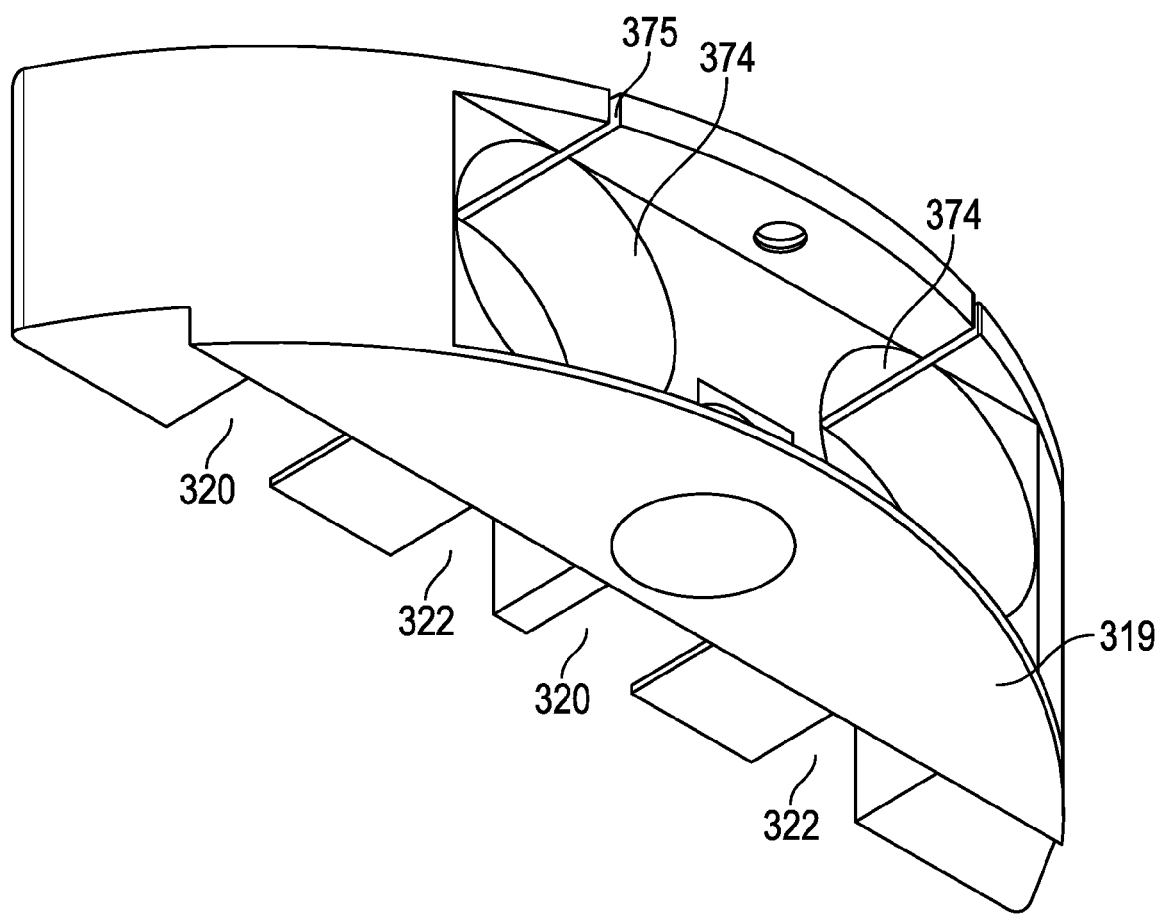
FIG. 23 is a perspective view of the part of the receptacle manifold block of FIGS. 21 to 22B which is designed to house the rolling seal axle end portions and the actuator assisting springs when attached to the remainder of the manifold block.

As illustrated in FIGS. 22A and 22B, respective actuator ports 320 are located on the left hand side (as viewed in the drawing) of each axle portion 329, while actuator ports 322 are located on the opposite or right hand side of axle portion 329, with all of the actuator ports arranged in a line in one half of the manifold block. The same alternating actuator port arrangement is provided in the plug manifold block. This also simplifies construction.

Figure 25:
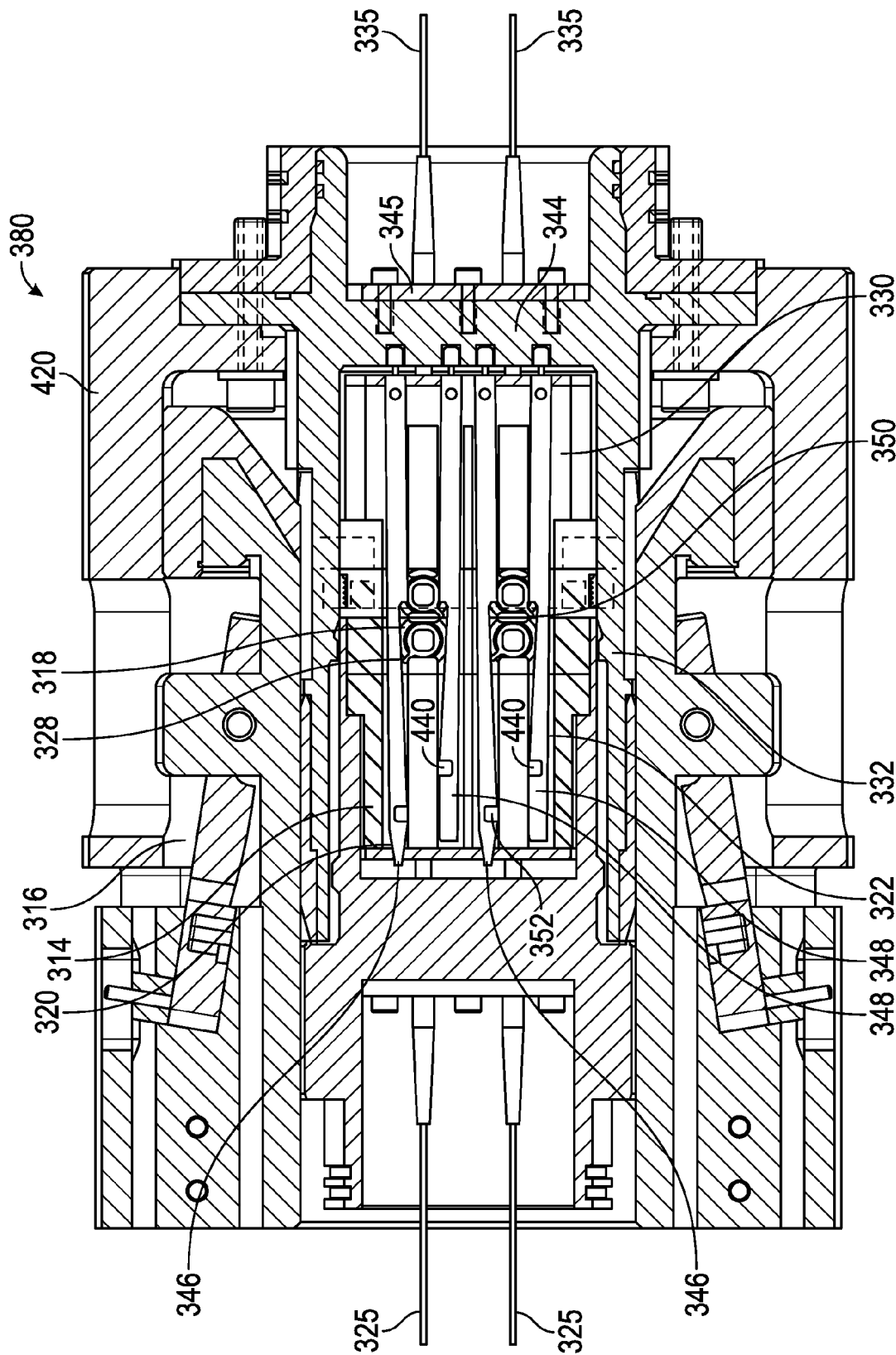
FIG. 25 is a cross sectional view of the mated plug and receptacle units, with some parts omitted for clarity.

Operation of the rolling seals as the plug and receptacle units are moved between the unmated positions of FIGS. 14 to 18, 20A, 21 and 22A and the mated positions of FIGS. 20B, 22B and 25, and back from the mated to the unmated positions is described in more detail below.

When the rolling seals in the plug unit are in the closed position as in FIGS. 17 and 18, each of the actuator rods 348 has an end face flush or substantially flush with the forward end face of plug manifold block 330, at the end of the respective passageways 340, while the forward ends of actuator rods 346 stand proud, as seen in FIG. 17. Operation of actuator rods 346 to open the two rolling seals 318 in the receptacle assembly is illustrated in FIGS. 24A and 24B.

Prior to connection of the plug and receptacle units, each of the rolling seals 318, 334 is in the closed and sealed position of FIGS. 14 to 18. Each rolling seal projects partially outwardly from the respective seat in the plug and receptacle manifold end face, as in the previous embodiment, and as illustrated for the receptacle unit in FIG. 24A. The plug unit is omitted from FIGS. 24A to 24D for clarity in illustrating the actuator operation. As the two units are brought together in the proper relative orientation, the passageways 340 carrying the receptacle actuator rods 346 are aligned with the corresponding passageways 320 in the front face of the receptacle manifold block, while passageways 342 carrying plug actuator rods 348 are aligned with the corresponding passageways 322 in the receptacle manifold block.

Figure 24A:
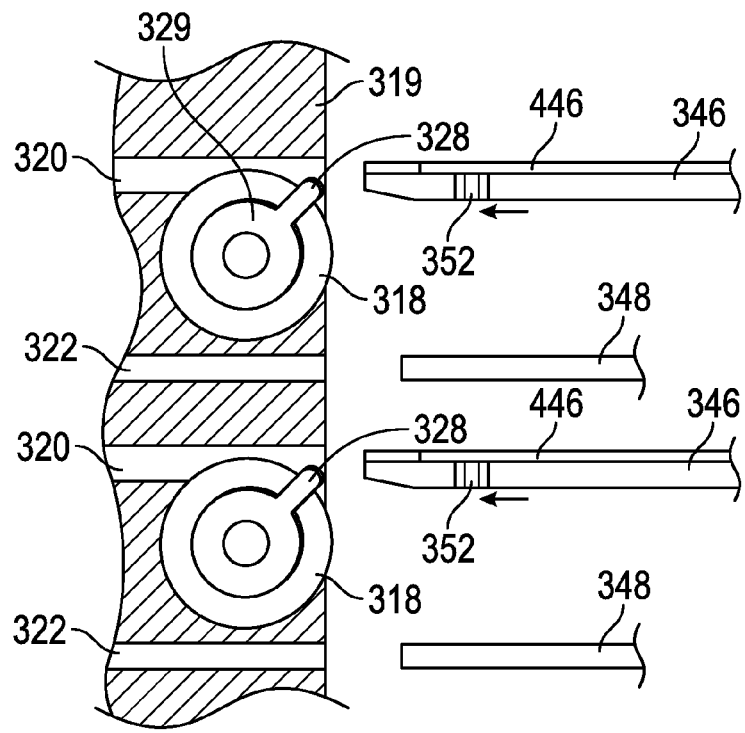
FIGS. 24A to 24D are partial sectional views of the receptacle unit rolling seals and the actuator rods extending from the plug unit into the aligned bore in the receptacle unit at successive positions during mating and de-mating as the seals are rolled back and forth between a fully closed position and a fully open position.
Figure 24B:
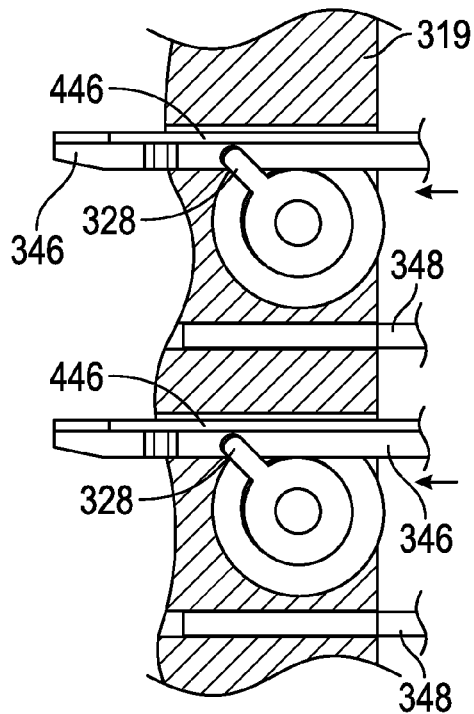

FIG. 24A illustrates the positions of rods 346 relative to the end face of the receptacle manifold just before the two units are initially brought into face to face engagement. The connector units are pressed together in the first stage of mating operation, in which the projecting portions of the plug and receptacle rolling seals 318, 334 are flattened, effectively expelling water from between their opposing faces and sealing the faces of the rolling seals of the plug to those of the receptacle. As the connector units are pushed further together, spring 338 of the plug unit begins to compress as the plug manifold 330 is urged inwardly. At the same time, the rods 346 and 348 begin to protrude outwardly or further outwardly through the open ends of passageways 340 and 342 and enter the aligned passageways 320, 322 of the receptacle manifold. Thus, as the receptacle continues into the plug unit shell, the receptacle manifold block is impaled by the rods 346, 348, as illustrated in FIG. 24B.

As rods 346 enter passageways 320, the actuator formations or notches 352 contact the respective rolling seal tabs or teeth 328, which protrude partially into passageways 320 as illustrated in FIG. 24A. As the rods 346 continue inwardly in the direction of the arrow, the engagement of one end of actuator or notch 352 with tabs 328 rolls the two rolling seals about their longitudinal axes in the same direction (anti-clockwise as viewed in FIGS. 24A and B), into the final, rearwardly directed orientation of FIG. 24B. At the same time, as the plug actuator rods 348 move further through plug manifold block 330 and into aligned bores 322 in receptacle manifold block 314, one end of each notch or actuator portion 440 (FIG. 17) engages the respective tabs 350 on rolling seals 334 in the plug unit, rolling these seals in the same direction but opposite to the rotation direction of seals 318 (i.e., clockwise as viewed in FIG. 25) between the rearwardly inclined position of FIG. 17 into a forwardly inclined position extending towards the forward end face of the plug manifold block as seen in FIG. 25. This simultaneously moves both the plug and receptacle rolling seals from the closed and sealed condition into the open condition, with the passageways through the seals aligned so that contacts in the plug unit travel through the aligned seal openings and into the receptacle chamber for engagement with corresponding fiber optic contact ferrules in the receptacle unit, in the same manner as described above in connection with the first embodiment (see FIG. 3).

FIG. 24B illustrates the final position of rolling seals 318. In this position, actuator rods 346 have been displaced slightly to allow actuator portions 352 to clear tabs 328, and the actuator rods have traveled further inwardly into the receptacle unit, while the rolling seals have rotated through 90 degrees into the open position. At the same time, the actuator assisting devices or springs 360 are coiled tighter to bias the rolling seals 318 back towards the closed position. Upper walls 446 (FIGS. 19, 24A and 24B) of the receptacle actuator rods 346 prevent the seals from rotating back towards the closed position when the plug and receptacle units are fully mated, since the outer ends of tabs 328 bear against walls 446 in this position, as seen in FIG. 24B. FIG. 24B illustrates the final position of actuator rods 346 when the plug and receptacle units are completely coupled together.

The relationship between the actuator portions 352 and 440 of the rods 346 and 348 is such that the receptacle and plug rolling seals are actuated simultaneously. As the units move from the position of FIGS. 14 to 18 to that of FIG. 25, the rolling seals have all been rolled through 90 degrees so that the bores are all open and connected from the receptacle unit into the plug unit. Any debris trapped between the mating end faces of the rolling seals tends to be rolled away as these faces rotate, and away from the region of the aligned bores. The dielectric fluid filling the seal bores as they rotate into the open position helps to prevent or restrict any seawater from entering the bores.

As in the previous embodiment, suitable releasable locking devices such as a locking collet or sleeve on the plug manifold in releasable snap-lock engagement with the outer shell of the receptacle unit holds the end faces in sealing engagement when the rolling seals are in the open position, and prevents separation of the end faces until the seals are rolled back into a closed position. This mechanism is described above in connection with the first embodiment and reference is made to that description for one example of a releasable locking device which may be used with this embodiment.

As the units are de-mated, the movements of the plug contacts and seal actuator rods are reversed, with the actuator rods acting to rotate all the rolling seals back in the opposite direction until they are in the fully closed position of FIGS. 14 to 16 again. This arrangement helps in preventing or substantially preventing any seawater from entering the sealed oil chambers of the plug or receptacle as these units are mated and de-mated.

Figure 24C:
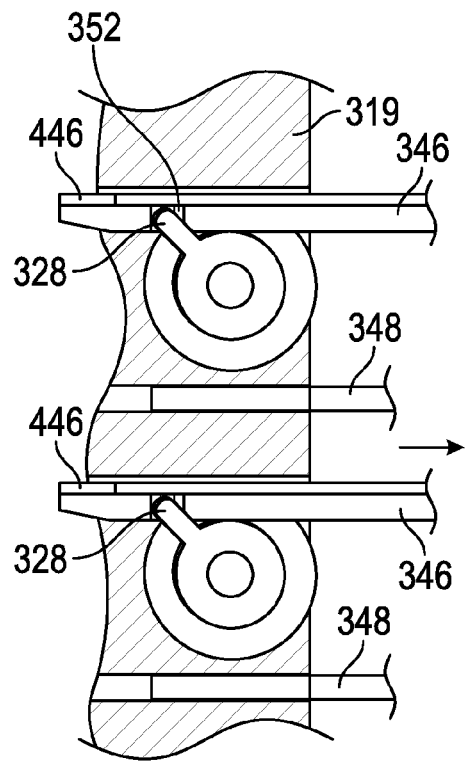
Figure 24D:
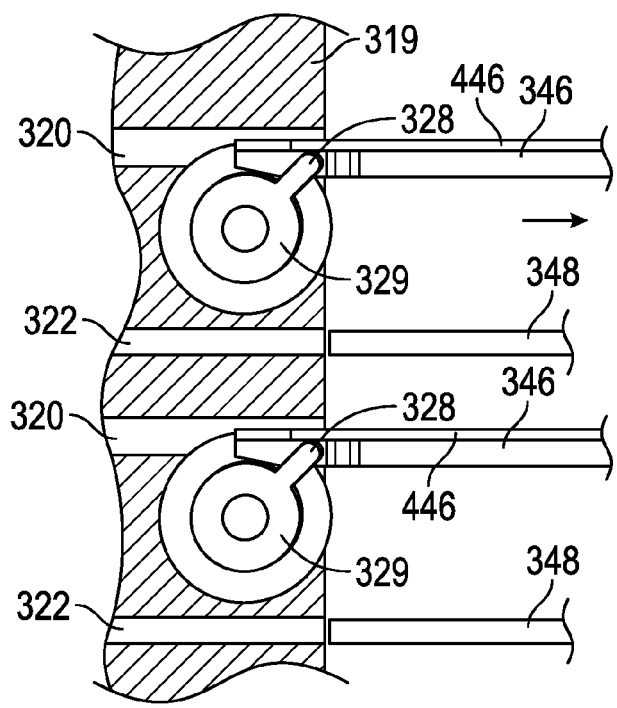

The operation of the actuator rods 346 as the plug and receptacle manifolds move outwardly relative to the plug shell bore as the units are de-mated is illustrated in FIGS. 24C and 24D. As the receptacle unit is moved out of the plug shell bore, the plug manifold is urged outwardly under the action of spring 338. Actuator rods 346 and 348 begin to move out of the receptacle manifold passageways 320 and 322, as indicated by the arrow in FIG. 24C, and back into the plug manifold ports or passageways 340 and 342, respectively. As indicated in FIG. 24C, as the rods 346 move in the direction of the arrow through ports 320, the opposite ends of the actuator notches 352 contact the rolling seal tabs 328 on the receptacle rolling seals 318. At the same time, the actuator notches 440 on plug actuator rods 348 re-enter passageways 342 and the opposite ends of the notches contact plug rolling seal tabs 350. The rods 346 continue to move out of receptacle passageways 320, pushing the tabs 328 to the right as viewed in FIGS. 24C and 24D, until the tabs contact the forward ends of the slots or passageways connecting each port 320 to the manifold bore in which the respective seal axle portions 329 is mounted, as indicated in FIG. 24D. This prevents the tabs 328 from moving any further. During this movement, the rolling seals 318 are rolled back from their open position as in FIGS. 20B, 21B, and 25 to the closed position as in FIGS. 14, 15, 20A, 22A, assuming the actuator rods operate correctly. Simultaneously with the operation of actuator rods 346 to close seals 318, the rods 346 move through passageways 342 to rotate seals 334 into the closed position in a similar manner. At this point, the collet sleeve has released the receptacle shell and the plug and receptacle manifolds can be separated.

There is a slight risk of the receptacle seals 318 not fully closing when the connector units are de-mated, for example due to any deformation or damage to the actuator rods 346, and particularly to the actuator portions or notches 352 which actuate the seals. The use of actuator assisting or biasing devices in association with each rolling seal 318 in the receptacle unit, such as clock springs 360 as described above and illustrated in FIGS. 20A to 22B, reduces or eliminates the risk of the seals not closing each time the connector is de-mated in the event of any deformation or failure of the actuator rods. If the rods 346 do not urge the seals into a fully closed position before exiting the bore 320 in the direction of the arrow in FIG. 24D, the biasing action of clock springs 360 forces the seals towards the closed position as soon as the rods 346 leave the passageway. As in the previous embodiment, this offers a measure of redundancy in the connector in the case of actuator failure.

The clock spring biasing devices of this embodiment can provide an improved seal from turbid conditions, since there is no need for a through hole for the seal axles, and the biasing devices do not interfere with other features of the rolling seal mechanism. There is only a slight modification to the seal axles to accommodate the springs, specifically addition of a reduced diameter portion 370 projecting from the existing enlarged portion 329 carrying the actuator engaging tab 328, as best seen in FIGS. 20A, 20B, 22A and 22B. In an embodiment, both the seal axle and the axle mount or manifold block are of metal such as titanium, but they may be of other material such as rigid plastic material, PEEK and engineering thermoplastic material, respectively, as in the previous embodiment, or other suitable rigid materials.

In one embodiment, clock springs 360 had a minimum inner diameter in the range from 0.1 to 0.2 inches, and the inner diameter was no less than 0.15 inches in one example. Axle portion 370 had an outer diameter slightly less than the spring inner diameter for seating the spring. The spring maximum outer diameter in the unloaded condition was in the range from 0.25 to 0.30 inches, and was no greater than 0.27 inches in one embodiment, with the bore or spring seat 374 having a slightly larger diameter for seating the spring. The maximum spring height in an embodiment was in the range from 0.065 to 0.075 inches, and in one example was no greater than 0.07 inches, with the length of spring mount portion 370 of the axle being greater than 0.07 inches. As seen in FIG. 22A, part of axle portion 370 extends through a smaller diameter opening before extending into enlarged spring seat 374 of the manifold part 319 in which the spring is mounted.

In embodiments as described above, the springs are designed to produce a predetermined torque in their pre-loaded condition. In an embodiment, the pre-loaded spring torque was around 2 in-lb. The dimensions of the axle mount in the manifold block and the axle portion on which the spring is mounted may be altered to encompass different spring thicknesses and lengths.

In the foregoing embodiments, the seal closure assisting devices or springs are mounted in the receptacle units to act between the housing or manifold in which the rolling seals are mounted and the rolling seal axles, but actuator biasing or assisting springs or other biasing devices may alternatively or additionally be mounted in the plug units, and each spring may be mounted at either end of the rolling seal.

The rotating seal members are cylindrical in the embodiments described above, but other alternative shapes may be used which have rounded mating surfaces for permitting the seal members to rotate in their mating seats. For example, the seal members may be spherical in a single contact connector. It will be understood that rollable shapes other than cylindrical may be used for the mating seals and recesses, such as spherical or part-spherical.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A connector assembly, comprising:
a receptacle unit and a plug unit configured for releasable mating engagement with the receptacle unit;
the receptacle unit having a front end, a rear end, and a longitudinal axis, at least one receptacle bore extending inwardly from the front end of the receptacle unit;
the front end of the receptacle unit having at least one receptacle recessed seat and said receptacle bore terminating in said receptacle recessed seat, the receptacle recessed seat having opposite ends;
at least one receptacle contact element mounted in said receptacle unit aligned with said receptacle bore;
at least one receptacle rolling seal having at least one through bore and rotatably mounted in said receptacle recessed seat for rotation about an axis transverse to said longitudinal axis between a first, closed position in which said through bore is offset from said receptacle bore and a second, open position in which said through bore is aligned with said receptacle bore, the receptacle rolling seal having opposite axle end portions projecting out of respective opposite ends of the receptacle recessed seat;
the plug unit having a rear end and a front end for engagement with the front end of the receptacle unit during engagement of the units, the front end of the plug unit having at least one opening aligned with the receptacle bore and a plug contact element slidably mounted in the plug unit for projecting out of the opening and through the bore in the receptacle seal member into the receptacle bore to contact the receptacle contact element when the through bore is in the second, open position;
an actuator mechanism configured to move the receptacle seal from the closed position to the open position when the units are mated and to move the receptacle seal from the open position to the closed positions when the units are de-mated; and
at least one biasing device engaged with an axle end portion of the at least one receptacle rolling seal in the receptacle unit, the biasing device being relaxed when the receptacle rolling seal is in the closed position and being loaded when the receptacle rolling seal is open to bias said receptacle rolling seal towards the closed position to assist the actuator mechanism in moving the receptacle rolling seal into the closed position on de-mating of the units.

2. A connector assembly, comprising:
a plug unit having a rear end and a front end, and a first bore extending to the front end of the plug unit, the front end having a first recessed seat of enlarged dimensions into which said first bore extends;
at least one plug contact slidably mounted in said first bore for movement between a retracted position within said bore and an extended position projecting forwardly through the front end of the plug unit;
a plug seal movably mounted in said first recessed seat, the plug seal having at least one through bore and being movable between an open position in which said through bore is aligned with said first through bore and a closed position in which said through bore is offset from said first through bore and the first through bore is sealed;
a receptacle unit having a rear end and a front end for engaging the front end of the plug unit in a predetermined orientation when the receptacle and plug units are connected together;
a second bore extending inwardly into said receptacle unit from said front end, the front end of the receptacle unit having a second recessed seat of shape and dimensions matching those of said first recessed seat, the second bore extending into said second recessed seat and being aligned with said first bore when said plug and receptacle unit are positioned in said predetermined relative orientation for mating engagement;
at least one receptacle contact mounted in said second bore;
a receptacle seal movably mounted in said second recessed seat, the receptacle seal having at least one through bore and being movable between an open position in which said through bore is aligned with said second bore and a closed position in which said through bore is offset from said second bore and said second bore is sealed;
an actuator mechanism which actuates each of said plug and receptacle seals to move from said closed to said open position as said receptacle unit is connected to said plug unit and from said open position to said closed position as the units are disconnected;
said actuator mechanism comprising at least two actuator members slidably mounted in said plug unit and projecting out of the front end of the plug unit into the receptacle unit as the units are connected together;
a first one of said actuator members comprising a plug seal actuator which moves said plug seal between said closed and open positions and from said open position to said closed positions as the units are connected and disconnected, respectively, and a second one of said actuator members comprising a receptacle seal actuator which moves said receptacle seal between said closed and open positions as said units are connected together and between said open and closed positions as said units are disconnected;
whereby said plug contact projects through the aligned through bores in said plug and receptacle seals and into said second bore to engage said receptacle contact in the connected conditions of said units; and
at least one seal biasing device associated with one seal of said plug and receptacle seals which biases said one seal from the open position towards the closed position as said units are disconnected;
wherein the plug unit has a pair of first recessed seats and first and second plug rolling seals rotatably mounted in the respective first recessed seats, the receptacle unit has a pair of second recessed receptacle seats and first and second receptacle rolling seals rotatably mounted in the respective second recessed receptacle seats, each receptacle rolling seal has opposite axle end portions projecting out of respective opposite ends of the second recessed receptacle seats, respectively, and said at least one biasing device comprises first and second springs mounted on an axle end portion of the first and second receptacle rolling seals, respectively.

3. The assembly of claim 2, wherein each receptacle rolling seal has an actuator tab located on one axle end portion of the respective receptacle rolling seal for engagement by said actuator mechanism as the units are connected and disconnected, and the first and second springs are mounted on the opposite axle end portion of the respective rolling seal to the actuator tab.

4. The assembly of claim 2, wherein each receptacle rolling seal has an actuator tab located on one axle end portion of the respective receptacle rolling seal for engagement by said actuator mechanism as the units are connected and disconnected, and the first and second springs are mounted on the same axle end portion of the respective receptacle rolling seal as the actuator tab.

5. A connector assembly, comprising:
a receptacle unit having a rear end, a front end, and a longitudinal axis;
at least one contact chamber in said receptacle unit and containing at least one receptacle contact;
the front end of the receptacle unit having at least one receptacle recessed seat having opposite first and second ends, and at least one receptacle bore extending from said recessed seat and communicating with said contact chamber;
at least one receptacle rolling seal movably mounted in said receptacle recessed seat, the rolling seal having at least one through bore, and being movable in a non-axial direction relative to said receptacle unit between a first, closed position in which said through bore is offset from said receptacle bore and the end of said receptacle bore is sealed, and a second, open position in which said through bore is aligned with said receptacle contact;
a plug unit releasably mateable with the receptacle unit, the plug unit having a longitudinal axis and a front end which engages with the front end of the receptacle unit during mating, and at least one plug contact which projects through the through bore into the receptacle unit to contact the receptacle contact when the units are mated and the receptacle rolling seal is in the open position;
the plug unit having at least one actuator which projects into the receptacle unit on mating to engage the receptacle rolling seal and move the receptacle rolling seal from the closed position to the open position prior to entry of the plug contact through the through bore, and retracts back into the plug unit on de-mating of the units to engage and move the receptacle rolling seal from the open position to the closed position;
at least one biasing device associated with the at least one receptacle rolling seal in the receptacle unit and biasing the receptacle rolling seal from the open position towards the closed position, the biasing device being configured to assist the actuator in moving the receptacle rolling seal into the closed position on de-mating of the units;
wherein the receptacle unit has a manifold at its forward end having a front face in which said receptacle recessed seat is located;
said at least one receptacle recessed seat and said at least one receptacle rolling seal each have a longitudinal axis extending in a direction parallel to the front face of the receptacle manifold and transverse to the longitudinal axis of the receptacle unit;
the receptacle rolling seal has first and second axle portions extending through the first and second ends of the receptacle recessed seat, respectively, the manifold having first and second axle receiving bores at the first and second ends of the receptacle recessed seat and the first and second axle portions are rotatably seated in the respective first and second axle receiving bores; and
the biasing device is located in the second axle receiving bore between the bore and second axle portion.

6. The assembly of claim 5, wherein the receptacle unit has a plurality of receptacle contacts and the plug unit has a corresponding number of plug contacts, the front end of the receptacle manifold has first and second receptacle recessed seats, a first receptacle rolling seal movably mounted in the first receptacle recessed seat, a second receptacle rolling seal movably mounted in the second receptacle recessed seat, and first and second biasing devices associated with the first and second receptacle rolling seal, respectively, and biasing the respective first and second receptacle rolling seals from the open position towards the closed position when the receptacle rolling seals are in the open position.

7. The assembly of claim 6, wherein the actuator comprises a single elongated actuator having first and second actuator formations configured to engage both receptacle rolling seals during mating and de-mating to move the receptacle rolling seals from the closed to the open position during mating and from the open position to the closed position during de-mating.

8. The assembly of claim 7, wherein said at least one biasing device comprises a first biasing device associated with the first receptacle rolling seal and a second biasing device associated with the second receptacle rolling seal.

9. The assembly of claim 8, wherein the biasing devices comprise springs.

10. The assembly of claim 6, wherein each receptacle rolling seal is cylindrical and has a plurality of seal through bores extending transversely through the respective receptacle rolling seal, the receptacle contacts being aligned with the respective seal through bores in the open position of the receptacle rolling seals, and each respective recessed seat is part-cylindrical and has opposite first and second ends, each biasing device being relaxed or less loaded in the closed position of the respective receptacle rolling seal and loaded in the open position of the respective rolling seal to urge the respective receptacle rolling seal towards the closed position.

11. The assembly of claim 10, wherein each biasing device comprises a spring.

12. The assembly of claim 11, wherein the springs each comprise a helically wound torsion spring.

13. The assembly of claim 11, wherein each spring comprises a spirally wound clock spring.

14. The assembly of claim 5, wherein the biasing device comprises a spring having a first end associated with the receptacle rolling seal and a second end associated with the receptacle recessed seat, the spring being in a relaxed condition when the receptacle rolling seal is in the closed position and in a loaded condition when the receptacle rolling seal is in the open position.

15. The assembly of claim 14, wherein the spring comprises a helically wound torsion spring engaged over at least part of said second axle portion and having a first end secured to said second axle portion and a second end secured in said second axle receiving bore.

16. The assembly of claim 14, wherein the spring comprises a spirally wound clock spring engaged over at least part of said second axle portion and having an inwardly bent inner end secured to said second axle portion and an outwardly bent outer end secured to the second axle receiving bore.

17. The assembly of claim 5, wherein the second axle portion has a first part, an actuator engaging tab on said first part, and a second part projecting from the first part, and the biasing device comprises a spring wound about the second part of the second axle portion and having an inner end secured to the second part and an outer end secured in the second axle receiving bore.

18. The assembly of claim 17, wherein the manifold has a main body having a cut-out segment extending across the second end of the receptacle recessed seat, and a separate manifold part of predetermined external shape and dimensions matching the cut out segment, the separate manifold part being secured in the cut-out segment to engage over the second axle portion and spring.

19. The assembly of claim 5, wherein the receptacle manifold has at least one actuator receiving passageway extending inwardly from the front face and transverse to the second axle receiving bore, and a connecting passage joining the second axle receiving bore to the actuator receiving passageway, and the second axle portion has an outer surface and a tab projecting from the outer surface through the connecting passage and into the actuator receiving passageway, the at least one actuator having an actuator formation which engages the tab to roll the receptacle rolling seal into the open position during mating and into the closed position during de-mating of the plug and receptacle units.

20. The assembly of claim 5, wherein the plug unit has a manifold having a front face which faces the front end of the receptacle unit during mating, the plug manifold having at least one plug recessed seat and being movable between extended and retracted positions during mating of the plug and receptacle units, at least one plug rolling seal mounted in said plug recessed seat, said plug rolling seal having at least one through bore and being movable between an open position in which said through bore is aligned with said at least one plug contact and a closed position in which said through bore is offset from said at least one plug contact, and at least one second actuator is mounted in said plug unit for movement relative to said plug manifold to actuate said plug rolling seal as the units are mated to move the plug rolling seal from the closed position to the open position, and to actuate the plug rolling seal to move back from the closed position to the open position as the units are de-mated.

21. The assembly of claim 20, wherein said plug unit has at least first and second actuator mounting bores, said receptacle actuator comprises at least one first actuator rod mounted in the first actuator mounting bore, said second actuator comprises at least one second actuator rod mounted in the second actuator mounting bore, and said receptacle manifold has at least first and second actuator passageways aligned with said first and second actuator mounting bores, respectively, when said units are mated, whereby forward portions of said first and second actuator rods extend out of said plug manifold into said first and second actuator passageways in said extended position when the units are mated and the plug manifold moves into the retracted position.

22. The assembly of claim 21, wherein the at least one receptacle and plug recessed seats each comprises a part-cylindrical recess having an axis extending perpendicular to said longitudinal axis and opposite first and second ends, the plug seal comprises a plug rolling seal and the receptacle seal comprising a receptacle rolling seal, each rolling seal being of cylindrical shape and rotatably mounted in said respective part-cylindrical recess and having a plurality of bores extending through said rolling seal in a direction transverse to said axis, said plug rolling seal having at least one axle portion projecting out of one end of the respective part-cylindrical recess, the first actuator passageway in the receptacle manifold extending adjacent said first axle portion of the receptacle rolling seal, said first axle portion having a projecting tab which extends into said first actuator passageway and the first actuator having a tab engaging formation which engages the projecting tab of the receptacle rolling seal to rotate the receptacle rolling seal from the closed to the open position as the plug and receptacle units are mated and the first actuator moves into the first actuator passageway, and which engages the projecting tab of the receptacle rolling seal to rotate the receptacle rolling seal from the open to the closed position as the plug and receptacle units are de-mated and the first actuator moves out of the first actuator passageway.

23. The assembly of claim 22, wherein the receptacle unit has at least first and second recessed receptacle seats and the plug unit has corresponding first and second recessed plug seats, said at least one receptacle rolling seal comprises a first receptacle rolling seal rotatably mounted in the first recessed receptacle seat and a second receptacle rolling seal rotatably mounted in the second recessed receptacle seat, said at least one plug rolling seal comprises a first plug rolling seal rotatably mounted in the first recessed plug seat and a second plug rolling seal rotatably mounted in the second recessed plug seat, and said at least one biasing device comprises a first biasing device associated with the first receptacle rolling seal which biases the first receptacle rolling seal towards the closed position during de-mating and a second biasing device associated with the second receptacle rolling seal which biases the second receptacle rolling seal towards the closed position during de-mating.

24. The assembly of claim 23, wherein said plug unit has first and second receptacle seal actuator rods and first and second plug seal actuator rods extending parallel to the longitudinal axis of the plug unit, the receptacle unit has a first pair of actuator receiving passageways aligned with the first and second receptacle seal actuator rods, respectively, and a second pair of actuator receiving passageways aligned with the first and second plug seal actuator rods, respectively, when the units are positioned for mating engagement, the actuator receiving passageways receiving portions of the first and second receptacle seal actuator rods and first and second plug actuator rods extending out of the front end of the plug manifold during mating of the units.

25. The assembly of claim 24, wherein the first and second ends of the first recessed receptacle seat are aligned with the first and second ends, respectively, of the second recessed receptacle seat, and the first and second pairs of actuator passageways are aligned across the second ends of the first and second recessed receptacle seats, with one actuator passageway of each pair located adjacent the second end of the first receptacle rolling seal and the other actuator passageway of each pair located adjacent the second end of the second receptacle rolling seal.

26. A connector assembly, comprising:
   a plug unit having a rear end and a front end, and a first bore extending to the front end of the plug unit, the front end having a first recessed seat of enlarged dimensions into which said first bore extends;
   at least one plug contact slidably mounted in said first bore for movement between a retracted position within said bore and an extended position projecting forwardly through the front end of the plug unit;
   a plug seal movably mounted in said first recessed seat, the plug seal having at least one through bore and being movable between an open position in which said through bore is aligned with said first through bore and a closed position in which said through bore is offset from said first through bore and the first through bore is sealed;

a receptacle unit having a rear end and a front end for engaging the front end of the plug unit in a predetermined orientation when the receptacle and plug units are connected together;

a second bore extending inwardly into said receptacle unit from said front end, the front end of the receptacle unit having a second recessed seat of shape and dimensions matching those of said first recessed seat, the second bore extending into said second recessed seat and being aligned with said first bore when said plug and receptacle unit are positioned in said predetermined relative orientation for mating engagement;

at least one receptacle contact mounted in said second bore;

a receptacle seal movably mounted in said second recessed seat, the receptacle seal having at least one through bore and being movable between an open position in which said through bore is aligned with said second bore and a closed position in which said through bore is offset from said second bore and said second bore is sealed;

an actuator mechanism which actuates each of said plug and receptacle seals to move from said closed to said open position as said receptacle unit is connected to said plug unit and from said open position to said closed position as the units are disconnected;

said actuator mechanism comprising at least two actuator members slidably mounted in said plug unit and projecting out of the front end of the plug unit into the receptacle unit as the units are connected together;

a first one of said actuator members comprising a plug seal actuator which moves said plug seal between said closed and open positions and from said open position to said closed positions as the units are connected and disconnected, respectively, and a second one of said actuator members comprising a receptacle seal actuator which moves said receptacle seal between said closed and open positions as said units are connected together and between said open and closed positions as said units are disconnected;

whereby said plug contact projects through the aligned through bores in said plug and receptacle seals and into said second bore to engage said receptacle contact in the connected conditions of said units;

at least one seal biasing device associated with one seal of said plug and receptacle seals which biases said one seal from the open position towards the closed position as said units are disconnected; and said first and second recessed seats each have opposite first and second ends and said plug and receptacle seals each have at least one axle portion projecting through one end of the respective recessed seat, the plug and receptacle units each having at least one axle receiving bore at said one end of the respective first and second recessed seat in which said at least one axle end portion is rotatably mounted, and said biasing device is located in said axle receiving bore of the receptacle unit between said at least one axle portion and said axle receiving bore.

27. The assembly of claim 26, wherein said plug unit comprises a hollow shell with a fixed rear end and an open front end, and a plug manifold slidably mounted in the shell, the plug manifold body having a rear end and a forward end face defining the front end of said plug unit, said first bore comprising a through bore extending through the plug manifold, said first contact element extending from the rear end of the plug unit and projecting forwardly into the through bore, the receptacle unit being dimensioned for engagement in said hollow shell to push said plug manifold rearwardly as said units are connected together, whereby said plug contact projects out of the front end of the plug manifold into the second bore, the plug manifold having at least first and second actuator through bores spaced from the first bore and extending in a direction transverse to the plug seal, and the receptacle unit having at least first and second actuator receiving passageways aligned with said actuator through bores in said predetermined relative orientation of said units; and the actuator members comprising a first actuator rod having a first end secured to the rear end of the plug shell and projecting forwardly into said first actuator through bore, and a second actuator rod having a first end secured to the rear end of the plug shell and projecting forwardly into said second actuator through bore, whereby said actuator rods project out of said actuator through bores and into said actuator passageways in said receptacle unit when said units are connected together, each actuator rod having an actuator portion, and said plug and receptacle seals each having a tab for engagement by the actuator portion on a respective actuator rod to move the respective plug and receptacle seal from the closed to the open position as said actuator rods project of said plug unit and into said receptacle unit during connection of said units.

28. The assembly of claim 26, wherein the biasing device comprises a spring having a first end associated with said one seal and a second end associated with the recessed seat in which said one seal is mounted, the spring being in a relaxed condition when said one seal is in the closed position and in a loaded condition when said one seal is in the open position.

29. The assembly of claim 26, wherein the biasing device comprises a spring engaging over at least part of said receptacle seal axle portion and having a first end secured to said axle portion and a second end secured in said bore, the spring being relaxed when the receptacle seal is closed and being loaded when the receptacle seal is open to bias said receptacle seal towards the closed position.

30. The assembly of claim 26, wherein said first and second recessed seats are part-cylindrical and said plug and receptacle seals comprise a plug rolling seal and a receptacle rolling seal, respectively, each rolling seal being at least substantially cylindrical and having a plurality of transverse seal through bores, the plug unit having a plurality of first bores extending transverse to said rolling seals and a plurality of plug contacts slidably mounted in the respective first bores and aligned with respective seal through bores of said plug rolling seal in the mated condition for movement between a retracted position and an extended position projecting forwardly through the front end of the plug unit, a plurality of second bores extending inwardly into said receptacle unit from said receptacle recessed seat and being aligned with said first bores when said plug and receptacle unit are positioned in said predetermined relative orientation for mating engagement, and at least one receptacle contact mounted in each said second bore; whereby said plug contacts project through the aligned transverse seal through bores in said plug and receptacle rolling seals and into said second bores to engage respective aligned receptacle contacts when said units are connected.

31. The assembly of claim 30, wherein the plug unit and receptacle unit each have at least two sets of spaced parallel bores aligned with corresponding bores in said sets of bores in the other unit, the front end of the plug unit having a pair of parallel first recessed seats and the front end of the receptacle unit having a pair of parallel second recessed seats, each set of bores terminating in a respective one of the recessed seats, first and second plug rolling seals are rotatably mounted in the respective first recessed seats of the plug unit, corresponding first and second receptacle rolling seals are rotatably mounted in the respective second recessed seats of the receptacle unit, and the receptacle unit has at least first and second biasing devices, the first biasing device associated with the first receptacle rolling seal and the second biasing device associated with the second receptacle rolling seal, the biasing devices being configured to bias said respective first and second receptacle rolling seals from the open position towards the closed position as said units are disconnected.

32. The assembly of claim 31, wherein said actuator mechanism comprise a first pair of receptacle actuators and a second pair of plug actuators slidably mounted in said plug unit for projecting out of the front end of the plug unit into the receptacle unit as the units are connected together, the first pair of receptacle actuators configured to urge said first and second receptacle rolling seals between said closed and open positions as the units are connected and from said open position to said closed positions as the units are disconnected, and the second pair of plug actuators configured to urge said first and second plug rolling seals between said closed and open positions as said units are connected together and between said open and closed positions as said units are disconnected.

33. The assembly of claim 32, wherein the first pair of receptacle actuators are configured to rotate said first and second receptacle rolling seals in a first direction as said units are connected together and in a second direction opposite to said first direction as said units are disconnected.

34. The assembly of claim 33, wherein the second pair of plug actuators are configured to rotate said first and second plug rolling seals in the opposite direction to said first and second receptacle rolling seals during connection and disconnection of said units.

35. The assembly of claim 31, wherein said plug unit has first and second pairs of actuator bores in which said first and second pairs of actuators are slidably engaged, and said receptacle unit has corresponding first and second pairs of actuator receiving passageways into which said first and second pairs of actuators engage during connection of said units.

36. The assembly of claim 35, wherein the first and second pairs of actuators are positioned in a line extending transverse to the recessed plug seats in said plug unit, the first pair of actuators comprising one actuator extending adjacent a first side of said one axle receiving bore which receives said one axle end portion of said first plug rolling seal and one actuator extending adjacent a first side of the axle receiving bore which receives said one axle end portion of said second plug rolling seal, and the second pair of actuators comprising one actuator adjacent a second side of said one axle receiving bore which receives said one axle end portion of said first plug rolling seal and one actuator extending adjacent a second side of the axle receiving bore which receives said one axle end portion of said second plug rolling seal.

* * * * *